United States Patent
Park et al.

(10) Patent No.: US 10,466,813 B2
(45) Date of Patent: Nov. 5, 2019

(54) ELECTRONIC DEVICE INCLUDING ELECTRONIC PEN AND METHOD FOR RECOGNIZING THE ELECTRONIC PEN THEREIN

(71) Applicant: Samsung Electronics Co., Ltd., Gyeonggi-do (KR)

(72) Inventors: Sungchul Park, Seoul (KR); Won-Wook Lee, Gyeonggi-do (KR); Jung-Jae Lee, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 145 days.

(21) Appl. No.: 15/626,303

(22) Filed: Jun. 19, 2017

(65) Prior Publication Data

US 2018/0032160 A1 Feb. 1, 2018

(30) Foreign Application Priority Data

Jul. 29, 2016 (KR) .................... 10-2016-0096829

(51) Int. Cl.
*G06F 3/0354* (2013.01)
*G06F 3/041* (2006.01)
*G06F 3/046* (2006.01)

(52) U.S. Cl.
CPC .......... *G06F 3/03545* (2013.01); *G06F 3/046* (2013.01); *G06F 3/0416* (2013.01)

(58) Field of Classification Search
CPC ..... G06F 3/03545; G06F 3/0416; G06F 3/046
See application file for complete search history.

(56) References Cited

U.S. PATENT DOCUMENTS

| | | | | |
|---|---|---|---|---|
| 2009/0273587 | A1* | 11/2009 | Tsuei | G06F 3/03545 345/179 |
| 2011/0012849 | A1* | 1/2011 | Cho | G06F 1/1626 345/173 |
| 2013/0321358 | A1* | 12/2013 | Park | G06F 3/03545 345/179 |
| 2014/0015783 | A1* | 1/2014 | Jeon | G06F 3/038 345/173 |
| 2014/0062948 | A1* | 3/2014 | Lee | G06F 3/0418 345/174 |
| 2014/0180481 | A1* | 6/2014 | Park | G06F 3/0487 700/275 |
| 2016/0109968 | A1* | 4/2016 | Roh | G06F 3/03545 345/173 |

FOREIGN PATENT DOCUMENTS

| | | |
|---|---|---|
| JP | 2003-345501 A | 12/2003 |
| KR | 10-2014-0065048 A | 5/2014 |
| KR | 10-2016-0046668 A | 4/2016 |

* cited by examiner

*Primary Examiner* — Kenneth Bukowski
(74) *Attorney, Agent, or Firm* — Cha & Reiter, LLC.

(57) ABSTRACT

An electronic device can include a housing including a first surface, a second surface, and a third surface, the first and second surface defining an electronic component mounting space and the second and third surface defining a pen mounting space adapted to receive an electronic pen; and a display and an ElectroMagnetic Resonance (EMR) sensor pad disposed in the electronic component mounting space. When the electronic pen is mounted in the pen mounting space, the EMR sensor pad may detect a resonance frequency of a coil body of the electronic pen.

14 Claims, 15 Drawing Sheets

ELECTRONIC DEVICE INCLUDING ELECTRONIC PEN AND METHOD FOR RECOGNIZING THE ELECTRONIC PEN THEREIN

CLAIM OF PRIORITY

The present application claims the benefit under 35 U.S.C. § 119(a) to a Korean patent application filed in the Korean Intellectual Property Office on Jul. 29, 2016, and assigned Serial No. 10-2016-0096829, the entire disclosure of which is hereby incorporated by reference.

TECHNICAL FIELD OF THE DISCLOSURE

The present disclosure relates generally to an electronic device including an electronic pen. More particularly, the present disclosure relates to an electronic device including an electronic pen and a method for recognizing the electronic pen.

BACKGROUND

Electronic devices such as mobile communication terminals have widely proliferated. Such mobile communication terminals may include a touch-type display and a high-resolution camera module, and can capture still images and video images in addition to communication with other parties. Also, these mobile communication terminals can play multimedia contents such as music and video, and surf the web by accessing data networks such as an LTE network. Such mobile communication terminals are equipped with high-performance processors and thus can execute various functions rapidly.

These mobile communication terminals also can include electronic pens as auxiliary devices for various functions.

Accordingly, to accommodate the electronic pen, the mobile communication terminal may include a pen mounting space for receiving the electronic pen for proper storage. To use the electronic pen if needed, the user can eject the electronic pen.

Conventionally, the mobile communication terminal can detect whether the electronic pen is inserted into the pen mounting space. The mobile communication terminal can include a separate detection circuit for detecting whether the electronic pen is inserted therein. The detection circuit can include a hall sensor for detecting the magnetic force of a magnet of the electronic pen, and a switching device (e.g., a tact switch) for mechanically switching when the electronic pen is inserted.

However, the above conventional mechanisms to detect whether the electronic pen is inserted in the space require additional component mounting spaces in the electronic device, which may be disadvantageous because current design trends favor slim designs for the devices.

SUMMARY

To address the above-discussed deficiencies of the prior art, one aspect of the present disclosure is to provide an electronic device including an electronic pen and a method for recognizing the electronic pen.

Another aspect of the present disclosure is to provide a design of the electronic device including an electronic pen that minimizes the size of the device, and a method for recognizing the electronic pen without additional components.

Yet another aspect of the present disclosure is to provide an electronic device including an electronic pen which can maximize efficiency of the electronic device by minimizing power consumption when recognizing insertion of the electronic pen, and a method thereof.

According to one aspect of the present disclosure, an electronic device can include a housing including a first surface, a second surface, and a third surface, the first and second surface defining an electronic component mounting space and the second and third surface defining a pen mounting space adapted to receive an electronic pen; and a display and an ElectroMagnetic Resonance (EMR) sensor pad disposed in the electronic component mounting space. When the electronic pen is mounted in the pen mounting space, the EMR sensor pad may detect a resonance frequency of a coil body of the electronic pen.

According to another aspect of the present disclosure, an electronic device can include a housing including a first surface and a second surface opposite to the first surface; a hole extending lengthwise into the housing; a display exposed through the first surface; a stylus pen adapted to be inserted into the hole; a detection circuit for detecting whether the stylus pen approaches or hovers over the display; and a processor electrically coupled to the display and the detection circuit. The detection circuit also detects whether the stylus pen is inserted into the hole.

According to another aspect of the present disclosure, an electronic device can include a housing including a first surface, a second surface, and a third surface, the first and second surface defining an electronic component mounting space and the second and third surface defining a pen mounting space adapted to receive an electronic pen; a display and an ElectroMagnetic Resonance (EMR) sensor pad disposed in the electronic component mounting space; and a detection circuit interposed between the first surface and the second surface and adapted to detect, when the electronic pen is mounted in the pen mounting space, a resonance frequency of a coil body of the electronic pen.

According to yet another aspect of the present disclosure, a method for recognizing electronic pen insertion into an electronic device can include detecting whether a user stops using the electronic pen; when the user stops using the electronic pen, driving a detection circuit; detecting insertion of the electronic pen using the detection circuit; when the insertion of the electronic pen is detected, stop driving an ElectroMagnetic Resonance (EMR) sensor pad which detects data input from the electronic pen; detecting whether the electronic pen is extracted from the electronic device; and when the electronic pen is extracted, re-driving the EMR sensor pad.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
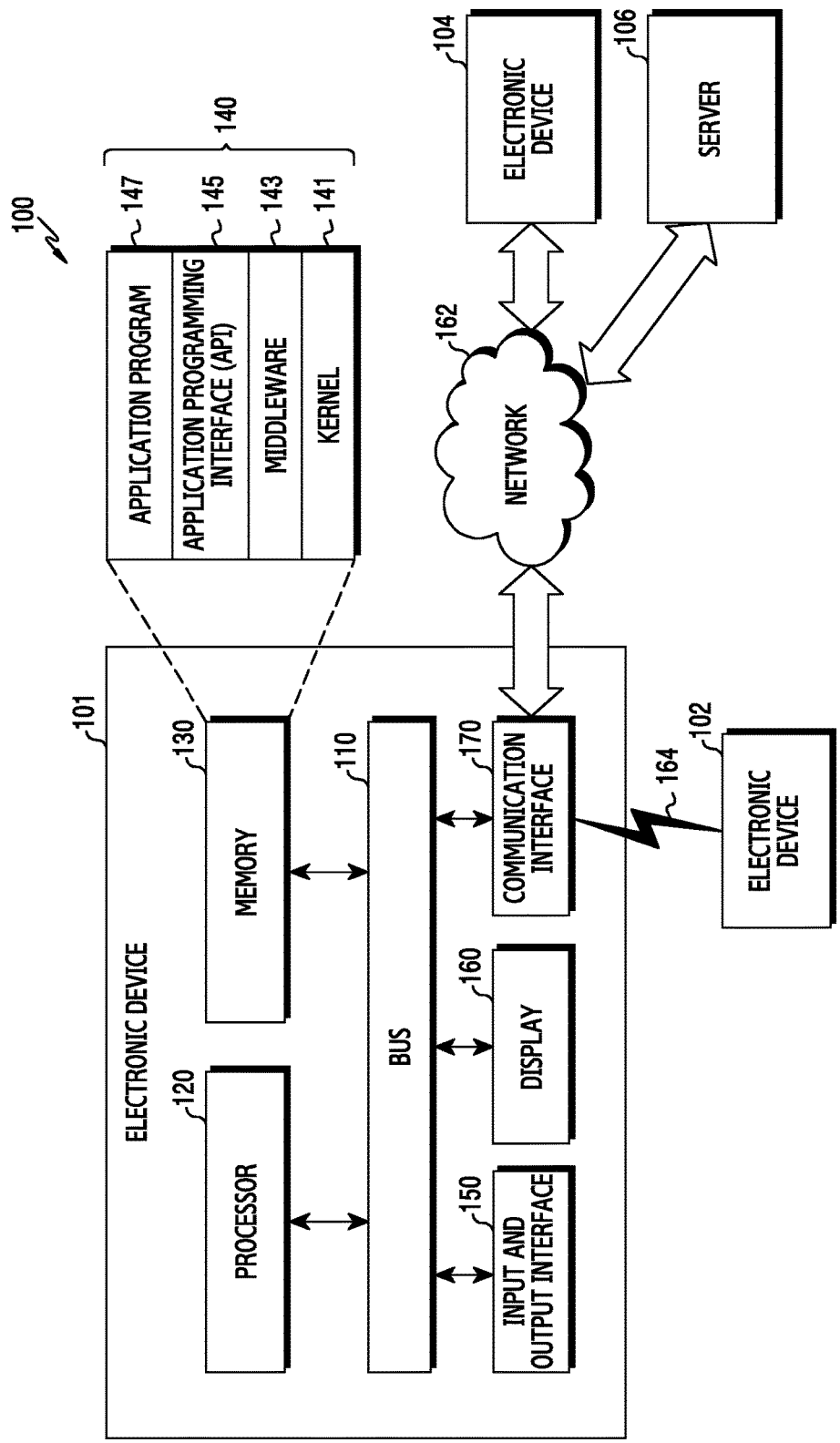
FIG. 1 is a diagram of a network including an electronic device according to one embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms and words used in the following description and claims are not limited to their dictionary meanings, but are merely used to enable a clear and consistent understanding of the present disclosure. Accordingly, it should be apparent to those skilled in the art that the following description of embodiments of the present disclosure is provided for illustrative purposes only and not for the purpose of limiting the present disclosure as defined by the appended claims and their equivalents.

Singular terms "a," "an," and "the" include plural references unless the context clearly dictates otherwise. Thus, for example, reference to "a component surface" includes reference to one or more of such surfaces.

The embodiments described herein are by way of illustration only and should not be construed in any way to limit the scope of the disclosure. Those skilled in the art will understand that the principles of the present disclosure may be implemented in any suitably arranged electronic device.

As used herein, the term "substantially" means that the recited characteristic, parameter, or value need not be achieved exactly, but that variations such as tolerances, measurement errors, measurement accuracy limitations and other factors known to those of skill in the art, may occur in amounts that do not preclude the effect the characteristic was intended to provide.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

When an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, when an element (for example, a first element) is "directly coupled with/to" or "directly connected to" another element (for example, a second element), there is no intervening element (for example, a third element) between the element and another element.

The term "module" as used herein may imply a unit including one of hardware, software, and firmware, or a combination thereof. The term "module" may be interchangeably used with terms, such as unit, logic, logical block, component, or circuit. A module as described herein may be a minimum unit of an integrally constituted component or may be a part thereof. A module may be a minimum unit for performing one or more functions or may be a part thereof. A module may be mechanically or electrically implemented. For example, a module may include at least one of an application-specific integrated circuit (ASIC) chip, field-programmable gate arrays (FPGAs), and a programmable-logic device, which are known or will be developed and which perform certain operations.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include various medical devices (e.g., various portable medical measurement devices (such as blood glucose meters, heart rate monitors, blood pressure monitors, or thermometers, and the like), magnetic resonance angiography (MRA) devices, magnetic resonance imaging (MRI) devices, computed tomography (CT) devices, scanners, ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

The electronic device may be one or more combinations of the aforementioned various devices. In addition, the electronic device may be a flexible device. Moreover, the electronic device is not limited to the aforementioned devices.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a diagram illustrating a network environment including an electronic device, according to an embodiment of the present disclosure.

Referring to FIG. 1, a network environment 100 includes an electronic device 101, which includes a bus 110, a processor 120, a memory 130, an input/output interface 150, a display 160, and a communication interface 170. The electronic device 101 can omit at least one of the components or further include another component.

The bus 110 includes a circuit for connecting the components and delivering communications such as a control message therebetween.

The processor 120 includes one or more of a central processing units (CPUs), an application processor (AP), and a communication processor (CP). The processor 120 processes an operation or data on control of and/or communication with another component of the electronic device 101. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The processor 120, which can be connected to a long term evolution (LTE) network, determines whether a call is connected over a circuit switched (CS) service network using caller identification information, such as a caller phone number of the CS service network, such as a 2nd generation (2G) or 3rd generation (3G) network. For example, the processor 120 receives incoming call information, such as a CS notification message or a paging request message of the CS service network over the LTE network, such as circuit-switched fallback (CSFB). The processor 120 being connected to the LTE network receives incoming call information, such as a paging request message over the CS service network, such as single radio LTE (SRLTE).

When receiving an incoming CS notification message or a paging request message of the CS service network over the LTE network, the processor 120 obtains caller identification information from the incoming call information. The processor 120 displays the caller identification information on the display 160. The processor 120 determines whether to connect the call based on input information corresponding to the caller identification information displayed on the display 160. For example, when detecting input information corresponding to an incoming call rejection, through the input/output interface 150, the processor 120 restricts the voice call connection and maintains the LTE network connection. For example, when detecting input information corresponding to an incoming call acceptance, through the input/output interface 150, the processor 120 connects the voice call by connecting to the CS service network.

When receiving the incoming CS notification message or a paging request message of the CS service network over the LTE network, the processor 120 obtains caller identification information from the incoming call information. The processor 120 determines whether to connect the call by comparing the caller identification information with a reception control list. For example, when the caller identification information is included in a first reception control list, such as a blacklist, the processor 120 restricts the voice call connection and maintains the connection to the LTE network. When the caller identification information is not included in the blacklist, the processor 120 connects the voice call by connecting to the CS service network. When the caller identification information is included in a second reception control list, such as a white list, the processor 120 connects the voice call by connecting to the CS service network.

When receiving the incoming call information, such as a paging request message of the CS service network over the LTE network, the processor 120 sends an incoming call response message, such as a paging response message, to the CS service network. The processor 120 suspends the LTE service and receives the caller identification information, such as a circuit-switched call (CC) setup message, from the CS service network. The processor 120 determines whether to connect the call by comparing the caller identification information with the reception control list. For example, when the caller identification information is included in the blacklist, the processor 120 restricts the voice call connection and resumes the LTE network connection. When the caller identification information is not included in the blacklist, the processor 120 connects the voice call by connecting to the CS service network. For example, when the caller identification information is included in the white list, the processor 120 connects the voice call by connecting to the CS service network.

The memory 130 can include volatile and/or nonvolatile memory. The memory 130 stores commands or data, such as the reception control list relating to at least another component of the electronic device 101. The memory 130 may store software and/or a program 140. The program 140 includes a kernel 141, middleware 143, an application programming interface (API) 145, and/or application programs (or applications) 147. At least some of the kernel 141, the middleware 143, and the API 145 may be referred to as an operating system (OS).

The kernel 141 controls or manages system resources, such as the bus 110, the processor 120, or the memory 130 used for performing an operation or function implemented by the other programs, such as the middleware 143, the API 145, or the applications 147. Furthermore, the kernel 141 provides an interface through which the middleware 143, the API 145, or the applications 147 connects the individual elements of the electronic device 101 to control or manage the system resources.

The middleware 143 functions as an intermediary for allowing the API 145 or the applications 147 to communicate with the kernel 141 to exchange data.

In addition, the middleware 143 processes one or more task requests received from the applications 147 according to priorities thereof. For example, the middleware 143 assigns priorities for using the system resources of the electronic device 101, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function, such as an instruction for file control, window control, image processing, or text control.

The input/output interface 150 functions as an interface that transfers instructions or data input from a user or another external device to the other element(s) of the electronic device 101. Furthermore, the input/output interface 150 outputs the instructions or data received from the other element(s) of the electronic device 101 to the user or an external electronic device.

The display 160 may include a liquid crystal display (LCD), a light emitting diode (LED) display, an organic LED (OLED) display, a micro electro mechanical system (MEMS) display, an electronic paper display, etc. The display 160 displays various types of content, such as text, images, videos, icons, or symbols for the user. The display 160 may include a touch screen and receive, for example, a touch, a gesture, proximity, a hovering input, etc., using an electronic pen or a user's body part (e.g., a finger). The display 160 may display a web page.

The communication interface 170 can establish a communication between the electronic device 101 and an external electronic device, such as a first external electronic device 102, a second external electronic device 104, or a server 106. For example, the communication interface 170 can communicate with the first external electronic device 102, the second external electronic device 104, or the server 106 in connection to the network 162 through wireless communication or wired communication or via a short-range communication 164. For example, the wireless communication can conform to a cellular communication protocol including at least one of LTE, LTE-advanced (LTE-A), code division multiple access (CDMA), wideband CDMA (WCDMA), universal mobile telecommunication system (UMTS), wireless broadband (WiBro), and global system for mobile communications (GSM).

The wired communication can include at least one of a universal serial bus (USB), a high definition multimedia interface (HDMI), a recommended standard 232 (RS-232), and a plain old telephone service (POTS).

The network 162 can include a telecommunications network, for example, a computer network such as local area network (LAN) or wide area network (WAN), the Internet, and a telephone network.

The electronic device 101 provides the LTE service in the single radio environment by use of at least one module functionally or physically separated from the processor 120.

Each of the first and second external electronic devices 102 and 104 may be a type of device that is the same as or different from the electronic device 101. The server 106 may include a group of one or more servers. All or some of the operations to be executed by the electronic device 101 may be executed by the external electronic devices 102 and 104 or the server 106. When the electronic device 101 may perform a certain function or service automatically or by request, the electronic device 101 may request some functions that are associated therewith from another electronic device instead of or in addition to executing the function or service by itself. The external electronic devices 102 and 104 or the server 106 may execute the requested functions or additional functions, and may transmit the results to the electronic device 101. The electronic device 101 may provide the requested functions or services by processing the received results. For example, a cloud computing technique, a distributed computing technique, or a client-server computing technique may be used.

Figure 2:
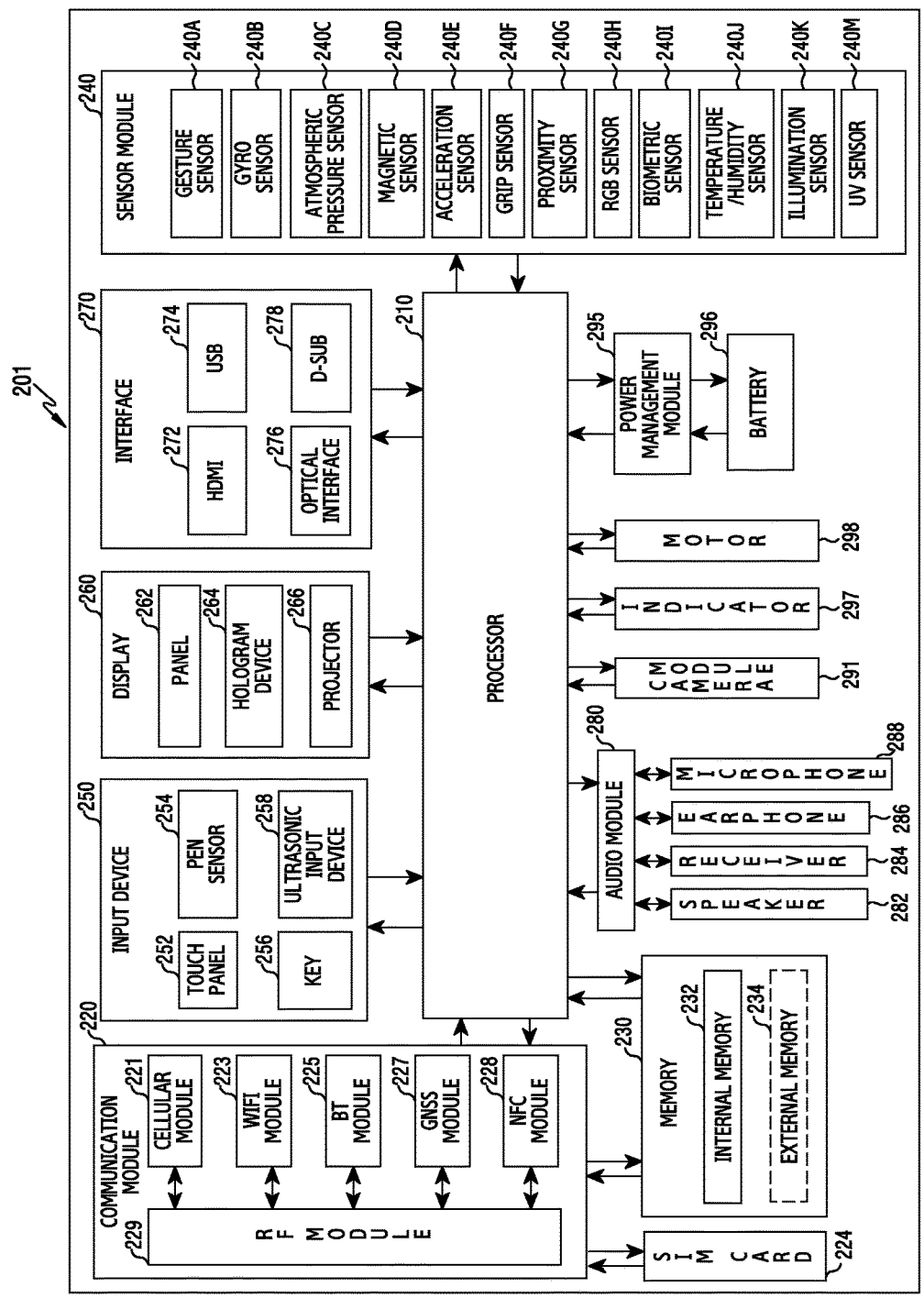
FIG. 2 is a block diagram of an electronic device according to one embodiment of the present disclosure.

FIG. 2 is a diagram of a configuration of an electronic device, according to an embodiment of the present disclosure.

Referring to FIG. 2, the electronic device 201 includes at least one processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls a plurality of hardware or software elements connected to the AP 210 by driving an OS or an application program. The AP 210 processes a variety of data, including multimedia data, performs arithmetic operations, may be implemented with a system on chip (SoC) and may further include a graphical processing unit (GPU).

The communication module 220 performs data transmission/reception in communication between the external electronic devices 102, 104 or the server 106 which may be connected with the electronic device 201 through the network 162. The communication module 220 includes a cellular module 221, a wireless-fidelity (Wi-Fi) module 223, a Bluetooth® (BT) module 225, a global navigation satellite system (GNSS) or GPS module 227, a near field communication (NFC) module 228, and a radio frequency (RF) module 229.

The cellular module 221 provides a voice call, a video call, a text service, or an Internet service, such as through a communication network including LTE, LTE-A, CDMA, WCDMA, UMTS, WiBro, and GSM, for example. In addition, the cellular module 221 identifies and authenticates the electronic device 201 within the communication network by using the SIM card 224. The cellular module 221 may perform at least some of the functions that can be provided by the AP 210. For example, the cellular module 221 may perform multimedia control functions.

The cellular module 221 includes a CP. Further, the cellular module 221 may be implemented, for example, with an SoC. Although elements, such as the cellular module 221, the memory 230, and the power management module 295 are illustrated as separate elements with respect to the AP 210 in FIG. 2, the AP 210 may also be implemented such that at least one part, such as the cellular module 221 of the aforementioned elements is included in the AP 210.

The AP 210 or the cellular module 221 loads an instruction or data, which is received from each non-volatile memory connected thereto or at least one of different elements, to a volatile memory and processes the instruction or data. In addition, the AP 210 or the cellular module 221 stores data, which is received from at least one of different elements or generated by at least one of different elements, into the non-volatile memory.

Each of the Wi-Fi module 223, the BT module 225, the GNSS module 227, and the NFC module 228 includes a processor for processing data transmitted/received through a corresponding module. Although the cellular module 221, the Wi-Fi module 223, the BT module 225, the GNSS module 227, and the NFC module 228 are illustrated in FIG. 2 as separate blocks, at least two of the cellular module 221, the Wi-Fi module 223, the BT module 225, the GNSS module 227, and the NFC module 228 may be included in one integrated chip (IC) or IC package. For example, at least some of processors corresponding to the cellular module 221, the Wi-Fi module 223, the BT module 225, the GNSS module 227, and the NFC module 228, such as a communication processor corresponding to the cellular module 221 and a Wi-Fi processor corresponding to the Wi-Fi module 223, may be implemented with an SoC.

The RF module 229 transmits/receives data, such as an RF signal, and may include a transceiver, a power amp module (PAM), a frequency filter, or a low noise amplifier (LNA), for example. In addition, the RF module 229 may further include a component for transmitting/receiving a radio wave on a free space in wireless communication, for example, a conductor, or a conducting wire. The cellular module 221, the Wi-Fi module 223, the BT module 225, the GNSS module 227, and the NFC module 228 may share one RF module 229, and at least one of these modules may transmit/receive an RF signal via a separate RF module.

The SIM card 224 may be inserted into a slot formed at a specific location of the electronic device 201. The SIM card 224 includes unique identification information, such as an integrated circuit card identifier (ICCID) or subscriber information, such as an international mobile subscriber identity (IMSI).

The memory 230 includes an internal memory 232 or an external memory 234.

The internal memory 232 may include at least one of a volatile memory, such as a dynamic random access memory (DRAM), a static RAM (SRAM), or a synchronous dynamic RAM (SDRAM) or a non-volatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory. The internal memory 232 may be a solid state drive (SSD).

The external memory 234 may include a flash drive, a compact flash (CF), secure digital (SD), micro-SD, mini-SD, extreme digital (xD), and a memory stick, and may be operatively coupled to the electronic device 201 via various interfaces.

The electronic device 201 may further include a storage unit (or a storage medium), such as a hard drive.

The sensor module 240 measures a physical quantity or detects an operation state of the electronic device 201, and converts the measured or detected information into an electric signal. The sensor module 240 includes, for example, at least one of a gesture sensor 240A, a gyro sensor 240B, a barometric pressure sensor or air sensor 240C, a magnetic sensor 240D, an acceleration sensor 240E, a grip sensor 240F, a proximity sensor 240G, a color sensor 240H, such as a red, green, blue (RGB) sensor, a biometric sensor 240I, a temperature/humidity sensor 240J, an illumination/illuminance sensor 240K and an ultraviolet (UV) sensor 240M.

Additionally or alternatively, the sensor module 240 may include, for example, an E-node sensor, an electromyography (EMG) sensor, an electroencephalogram (EEG) sensor, an electrocardiogram (ECG) sensor, and a fingerprint sensor.

The sensor module 240 may further include a control circuit for controlling at least one or more sensors included therein.

The input device 250 includes a touch panel 252, a (digital) pen sensor 254, a key 256, or an ultrasonic input unit 258.

The touch panel 252 recognizes a touch input by using at least one of an electrostatic type configuration, a pressure-sensitive type configuration, and an ultrasonic type configuration. The touch panel 252 may further include a control circuit. In the instance where the touch panel is of the electrostatic type, both physical contact recognition and proximity recognition are possible. The touch panel 252 may further include a tactile layer, which provides the user with a tactile reaction.

The (digital) pen sensor 254 may include a recognition sheet which can be a part of the touch panel or can be separately implemented from the touch panel. The key 256 may include a physical button, an optical key, or a keypad. The ultrasonic input device 258 may detect ultrasonic waves generated by an input tool through a microphone 288, and may confirm data corresponding to the detected ultrasonic waves.

The (digital) pen sensor 254 may be implemented using the same or similar method of receiving a touch input of a user or using an additional recognition sheet.

The key 256 may be a physical button, an optical key, a keypad, or a touch key.

The ultrasonic input unit 258 detects a reflected sound wave through a microphone 288 and is capable of radio recognition. For example, an ultrasonic signal, which may be generated by using a pen, may be reflected off an object and detected by the microphone 288.

The electronic device 201 may use the communication module 220 to receive a user input from an external device, such as a computer or a server connected thereto.

The display 260 includes a panel 262, a hologram 264, or a projector 266.

The panel 262 may be an LCD or an AM-OLED, for example. The panel 262 may be implemented in a flexible, transparent, or wearable manner, and may be constructed as one module with the touch panel 252.

The hologram device 264 uses an interference of light and displays a stereoscopic image in the air.

The projector 266 displays an image by projecting a light beam onto a screen. The screen may be located inside or outside the electronic device 201.

The display 260 may further include a control circuit for controlling the panel 262, the hologram device 264, or the projector 266.

The interface 270 may include an HDMI 272, a USB 274, an optical communication interface 276, or a d-subminiature (D-sub) 278. The interface 270 may be included, for example, in the communication interface 170 of FIG. 1, and may include a mobile high-definition link (MHL), SD/multimedia card (MMC) or infrared data association (IrDA).

The audio module 280 bilaterally converts a sound and an electric signal. At least some elements of the audio module 280 may be included in the input/output interface 150 of FIG. 1. The audio module 280 converts sound information which is input or output through a speaker 282, a receiver 284, an earphone 286, or the microphone 288.

The speaker 282 may output a signal of an audible frequency band and a signal of an ultrasonic frequency band. Reflected waves of an ultrasonic signal emitted from the speaker 282 and a signal of an external audible frequency band may be received.

The camera module 291 is a device for image and video capturing, and may include one or more image sensors, such as a front sensor or a rear sensor, a lens, an image signal processor (ISP), or a flash, such as an LED or a xenon lamp. In certain instances, it may prove advantageous to include two or more camera modules.

The power management module 295 manages power of the electronic device 201. The power management module 295 may include a power management integrated circuit (PMIC), a charger IC, or a battery gauge.

The PMIC may be placed inside an IC or an SoC semiconductor and may use a wired charging and/or a wireless charging method. The charger IC can charge a battery and can prevent an over-voltage or over-current flow.

Different types of wireless charging may include, for example, magnetic resonance type, magnetic induction type, or electromagnetic type. An additional circuit for the wireless charging, such as a coil loop, a resonant circuit, or a rectifier may be added.

The battery gauge may measure a residual quantity of the battery 296 and a voltage, current, and temperature during charging. The battery 296 stores or generates electricity and supplies power to the electronic device 201 by using the stored or generated electricity. The battery 296 may include a rechargeable battery or a solar battery.

The indicator 297 indicates a specific state, such as a booting state, a message, or a charging state of the electronic device 201 or a part thereof, such as the AP 210.

The motor 298 converts an electric signal into a mechanical vibration.

The electronic device 201 includes a processing unit, such as a GPU, for supporting mobile TV which processes media data according to a protocol of, for example, digital multimedia broadcasting (DMB), digital video broadcasting (DVB), or media flow.

Each of the aforementioned elements of the electronic device 201 may consist of one or more components, and names thereof may vary depending on a type of the electronic device 201. The electronic device 201 may include at least one of the aforementioned elements. Some of the elements may be omitted, or additional other elements may be further included. In addition, some of the elements of the electronic device 201 may be combined and constructed as one entity, so as to equally perform functions of corresponding elements before combination.

At least some parts of the electronic device 201, such as modules or functions thereof, or operations, may be implemented with an instruction stored in a non-transitory computer-readable storage media for example. The instruction may be executed by the processor 210, to perform a function corresponding to the instruction. The non-transitory computer-readable storage media may be the memory 230. At least some parts of the programming module may be executed by the processor 210. At least some parts of the programming module may include modules, programs, routines, and a set of instructions for performing one or more functions.

According to one embodiment, the pen sensor 254 can include an ElectroMagnetic Resonance (EMR) sensor pad for detecting whether an attachable electronic pen is inserted in the electronic device 201. According to an embodiment, an electromagnetic field generated from the EMR sensor pad causes feedback signals at a resonance frequency of a coil body of the electronic pen. The processor can detect input position of the pen using the feedback signal. The processor can include a control circuit (a driver IC) in the EMR sensor.

Figure 3A:
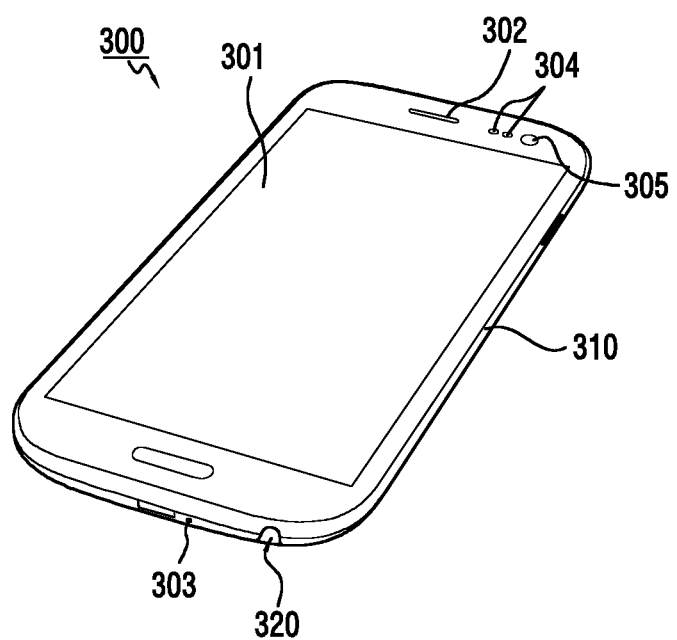
FIG. 3A and FIG. 3B are perspective views of an electronic device including an attachable electronic pen according to one embodiment of the present disclosure.
Figure 3B:
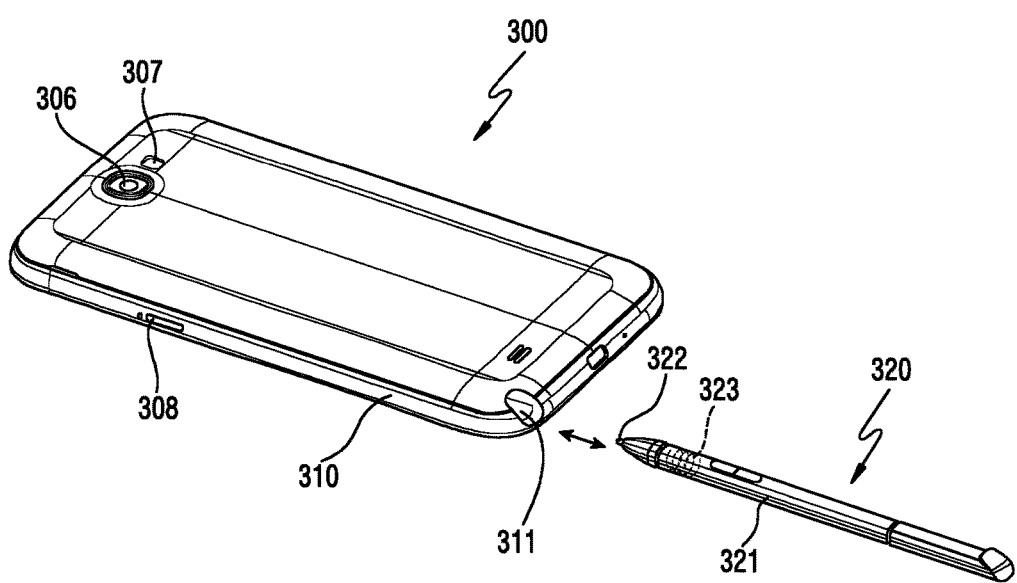

FIGS. 3A and 3B are perspective views of an electronic device including an attachable electronic pen according to one embodiment of the present disclosure.

Referring to FIGS. 3A and 3B, a display 301 can be disposed on the front of the housing 310 of the electronic device 300. A speaker device 302 for outputting audio can be mounted above the display 301. A microphone device 303 for detecting user voice can be mounted below the display 301. According to an embodiment, the display 301 can include a touch sensor and therefore include touchscreen capabilities. The display can also include a pressure responsive touch screen device, such as one that includes touch sensor and force sensor.

According to one embodiments, various components of the electronic device 300 can be mounted near the speaker device 302. Such components can include at least one sensor module 304. The sensor module 304 can include at least one of, for example, an illuminance sensor (e.g., a light sensor), a proximity sensor, an infrared sensor, and an ultrasonic sensor. According to an embodiment, the components may also include a first camera device 305. The components may also include an LED indicator for notifying the user. Components can be also mounted on the back of the housing 310. Such components can include at least one of a second camera device 306, various sensor modules (e.g., a heart rate sensor, an illuminance sensor, an ultrasonic sensor, etc.), and a lighting device 307. A physical key button 308 (e.g., a side key button) can protrude from the side of the electronic device 300.

According to one embodiment, the electronic device 300 can include an electronic pen 320 which can be stored in the pen mounting space 311 of the housing 310. The electronic pen 320 can include a coil body 323 inside the hollow pen housing 321 and a substrate (not shown) electrically coupled to the coil body 323. One end of the pen housing 321 includes a sharp tip 322 which facilitates input manipulation.

According to one embodiment, the electronic device 300 can include an EMR sensor pad therein for locating the electronic device 320 using electromagnetic induction. According to an embodiment, the EMR sensor pad can include a plurality of conductive patterns. The electronic device 300 can generate an electromagnetic field by applying power to the conductive patterns. When the electronic pen 320 contacts or hovers over the display 301, the coil body 323 generates feedback signals at a resonance frequency due to being in the electromagnetic field. The electronic device 300 can then locate the electronic pen 320 by receiving and processing the feedback signal.

According to one embodiment, the electronic device 300 can include a detection circuit for detecting the feedback signal for the resonance frequency of the coil body 323 when the electronic pen 320 is fully inserted into the pen mounting space 311. According to an embodiment, the detection circuit can use electromagnetic induction as a detection means for detecting whether the electronic pen 320 is inserted. Since the electronic device 300 detects the feedback signal of the coil body 323 to determine whether the electronic pen 320 is inserted into the pen mounting space 311, the electronic pen and/or the electronic device does not require additional components to make that determination. Accordingly, the sizes of the electronic pen or the electronic device may be minimized.

Figure 4:
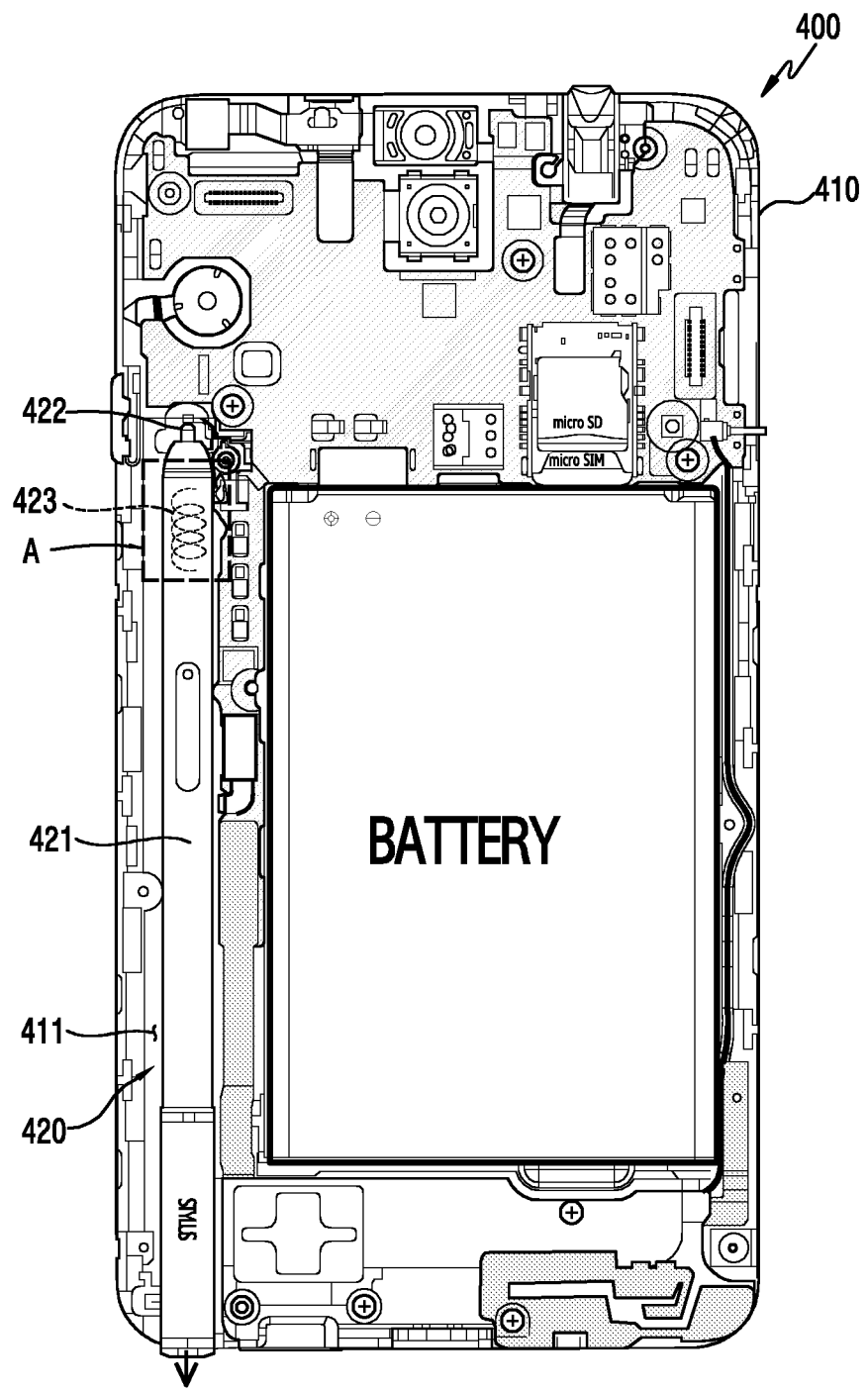
FIG. 4 is a diagram of a housing of an electronic device including a detection circuit for detecting whether an electronic pen is inserted according to one embodiment of the present disclosure.

FIG. 4 is a diagram of a housing of an electronic device including a detection circuit for detecting whether an electronic pen is inserted according to one embodiment of the present disclosure.

An electronic device 400 and an electronic pen 420 of FIG. 4 can be similar to the electronic device 300 and the electronic pen 320 of FIGS. 3A and 3B, or can represent another embodiment of the electronic device and the electronic pen.

Referring to FIG. 4, a housing 410 of the electronic device 400 can include a pen mounting space 411 for receiving the electronic pen 420. According to an embodiment, the electronic pen 420 can include a pen housing 421, a tip 422 at the end, and a coil body 423 therein. When the electronic pen 420 is completely inserted into the pen mounting space 411 of the housing 410, the electronic device 400 can include a detection circuit in an internal area (an area A of FIG. 4) which overlaps the coil body 423. The detection circuit can receive feedback signal for a resonance frequency from the coil body 423 through the area A. In order for this to occur, any intervening structure between the coil body 423 and the detection circuit should be made of a nonconductive material.

According to one embodiment, the housing 410 of the electronic device 400 is made of a metallic material. The area corresponding to the area A of the housing 410 is made of a nonconductive material. According to an embodiment, the area corresponding to the area A of the housing 410 is made of a nonconductive material (e.g., polycarbonates) which is double-injected or insert-molded. According to an embodiment, when at least one metal bracket is interposed between the pen mounting space 411 of the housing 410 and the detection circuit, a bracket area corresponding to the area A can be also made of a nonconductive material. In another embodiment, feedback signal from the coil body 423 may be detected by the detection circuit through an opening.

Figure 5A:
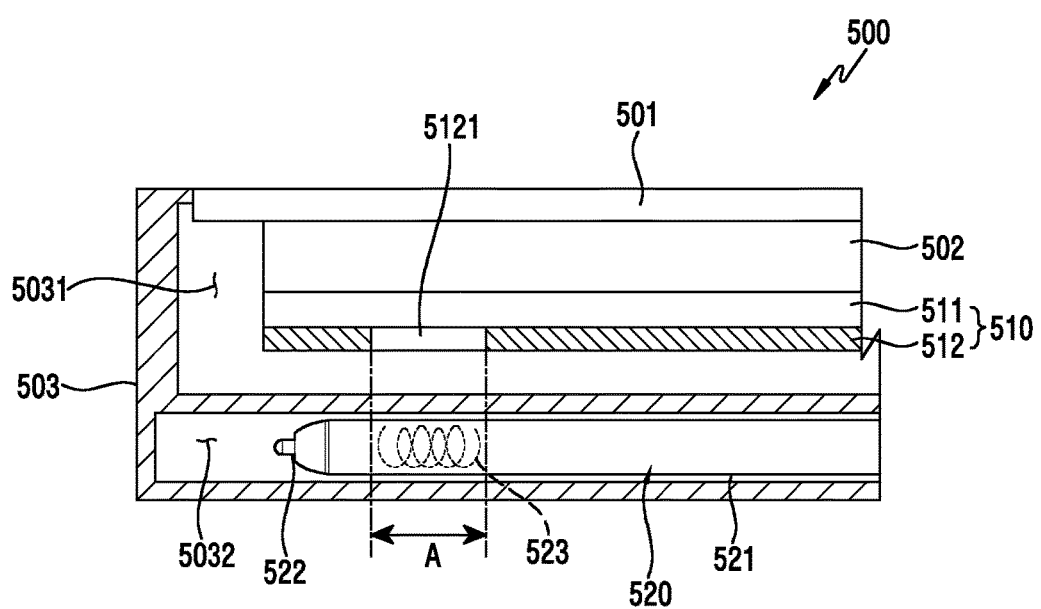
FIG. 5A is a cross-sectional view of an electronic device according to one embodiment of the present disclosure.

FIG. 5A is a cross-sectional view of an electronic device according to one embodiment of the present disclosure.

An electronic device 500 and an electronic pen 520 of FIG. 5A can be similar to the electronic device 300 and the electronic pen 320 of FIGS. 3A and 3B or the electronic device 400 and the electronic pen 420 of FIG. 4, or can represent other embodiment of the electronic device and the electronic pen.

Referring to FIG. 5A, a housing 503 of the electronic device 500 can include an electronic component mounting space 5031, and a pen mounting space 5032 isolated from the electronic component mounting space 5031. According to an embodiment, the electronic component mounting space 5031 can house various internal electronic components for the electronic device 500. A display module 502 and an EMR sensor pad 510 can be sequentially layered in the electronic component mounting space 5031 next to the window 501. The display module 502 and the EMR sensor pad 510 can be attached to each other using an adhesive member. The display module 502 can include a touch sensor. The touch sensor can include a capacitive touch sensor. The display module 502 may include a touch sensor and/or a force sensor which responds to a touch input.

According to one embodiment, the EMR sensor pad 510 can include a sensor member 511 including a plurality of conductive patterns (e.g., an X-axis array and a Y-axis array), and a shielding member 512 to shield the EMR sensor pad 510. Because the shielding member 512 is located below the EMR sensor pad 510, the EMR sensor pad 510 can only detect inputs from above, i.e. from an electronic pen used on the display module 502. This way, the shielding member 512 prevents sensor errors due to metallic members disposed under the sensor member 511. According to an embodiment, the EMR sensor pad 510 can receive power and generate an electromagnetic field under control of the processor of the electronic device. The EMR sensor pad 510 can further receive feedback signals from the coil body 523 of the electronic pen 520 due to resonance of the coil body 523 in the electromagnetic field.

According to one embodiment, the pen mounting space 5032 of the housing 503 can receive the electronic pen 520, which can be inserted or extracted at the user's discretion. According to an embodiment, the electronic pen 520 can include the coil body 523 disposed in the hollow housing 521, and a tip 522. The coil body 523 of the electronic pen 520 resonates in response to the electromagnetic field generated by the EMR sensor pad 510 and provides the feedback signal at its resonance frequency, to allowing the EMR sensor pad 510 to detect the input position of the electronic pen 520.

According to one embodiment, the shielding material (e.g., a conductive member) 512 may not be applied to an area 5121 which overlaps an area (area A of FIG. 5A) corresponding to the coil body 523 when the electronic pen 520 is completely inserted into the pen mounting space 5032. According to an embodiment, the area of the shielding member 512 which overlaps the coil body 523 may be an opening to allow the feedback signal from the coil body 523 to be detected by the EMR sensor pad 510. Thus, when the electronic pen 520 is completely inserted in the pen mounting space 5032 of the housing 503, the processor of the electronic device 500 can receive the feedback signal of the coil body 523 through the EMR sensor pad 510 and confirm that the electronic pen 520 is mounted in the pen mounting space 5032.

Figure 5B:
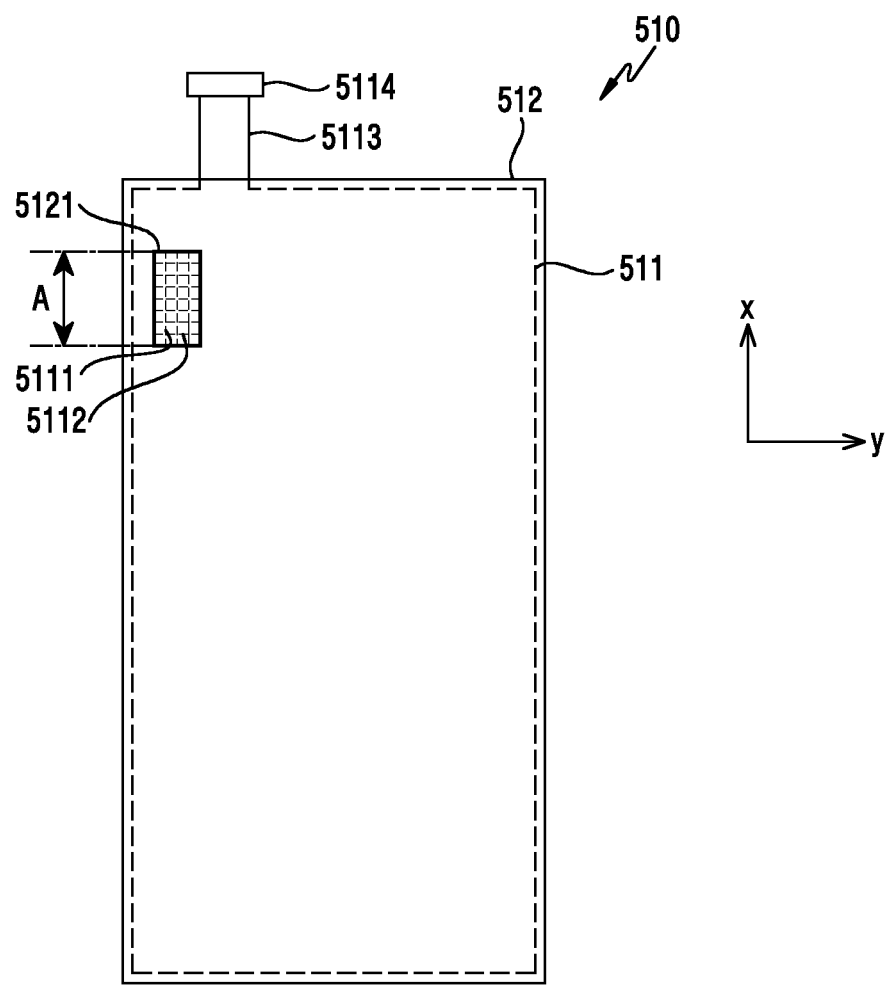
FIG. 5B is a diagram of an ElectroMagnetic Resonance (EMR) sensor pad of FIG. 5A according to one embodiment of the present disclosure.

FIG. 5B depicts the EMR sensor pad of FIG. 5A according to one embodiment of the present disclosure.

Referring to FIG. 5B, the EMR sensor pad 510 can include the sensor member 511 including the plurality of the conductive patterns, and the shielding member 512 such that the sensor member 511 generally senses only in one direction, i.e. the upwards direction in FIG. 5A. According to an embodiment, when the electronic pen 520 is completely inserted into the pen mounting space 5032, the shielding member 512 can include the opening 5121 which overlaps the coil body 523. According to an embodiment, the opening 5121 may be replaced by a dielectric member using double injection or insert-molding. Alternatively, the dielectric member may be taped to the shielding member 512.

According to one embodiment, the coil body 523 can be detected using at least one of the conductive patterns used to detect input on the display module 502 from the electronic pen 520. According to an embodiment, the conductive patterns can include a first pattern array 5111 which arranges the conductive patterns in a first direction (e.g., a X-axis direction) at regular intervals, and a second pattern array 5112 which arranges the conductive patterns in a second direction (e.g., a Y-axis direction) at regular intervals. The first pattern array 5111 and the second pattern array 5112 can be arranged to cross each other orthogonally or at a certain angle.

According to one embodiment, the first pattern array 5111 and the second pattern array 5112 can differentiate between a received feedback signal when the electronic pen is in use and a received feedback signal when the electronic pen is mounted in the pen mounting space 5032. According to an embodiment, the electronic device 500 can differentiate between a first feedback signal detected when the electronic pen 520, lying down, is inserted into the pen mounting space 5032, and a second feedback signal detected when the electronic pen 520 is substantially erected on the display. This is caused by the different orientations of the coil body 532 with respect to the electronic device. The first feedback signal is detected uniformly over the first pattern array 5111 and the second pattern array 5112, whereas the second feedback signal may detected relatively stronger in the first pattern array 5111 than the second pattern array 5112. Since the electronic pen 520 is inserted into the pen mounting space 5032 and does not move at all, the electronic device 500 may detect the uniform strength of the feedback signal over a certain time. Accordingly, the electronic device 500 may determine that the electronic pen 520 is inserted into the pen mounting space 5032. Part of the sensor member 511 may be allocated to the detection circuit, and the detection circuit may include a separate conductive pattern for detecting only the feedback signal of the coil body 523 when the electronic pen 520 is inserted.

According to one embodiment, a control circuit (e.g., a driver IC) connected to the sensor member 511 by means of a Flexible Printed Circuit (FPC) 5113 and a connector 5114 may be mounted on a substrate (e.g., a main board) of the electronic device 500. According to an embodiment, the control circuit can receive the feedback signal of the electronic pen 520 detected by the conductive patterns 5111 and 5112 of the sensor member 511 and forward the signal to the processor of the electronic device 500. Thus, the control circuit can process the feedback signals when the electronic pen is in use on the display module 502 or when the electronic pen is inserted into the pen mounting space 5032.

Figure 5C:
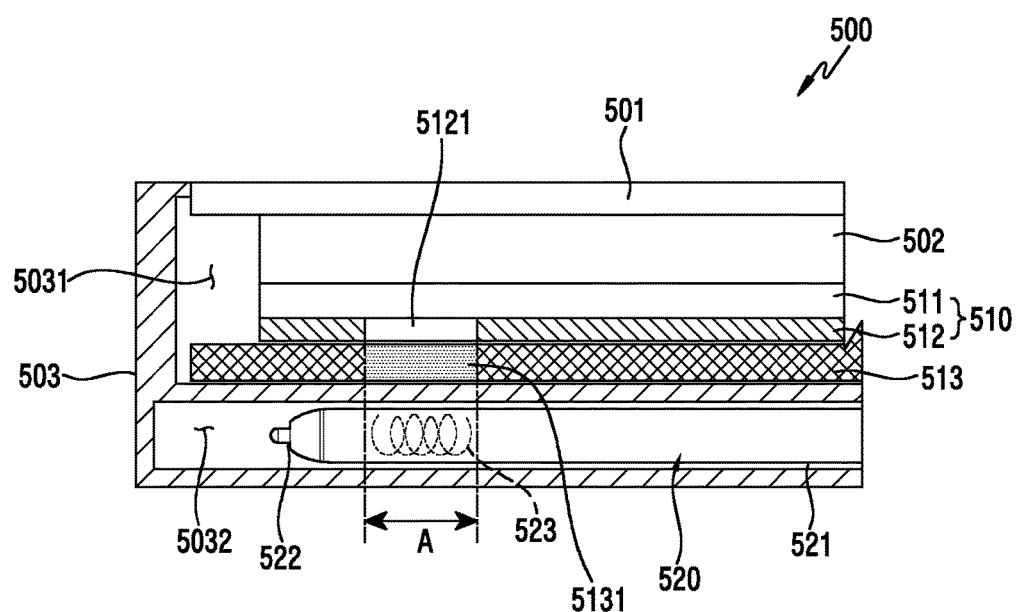
FIG. 5C is a cross-sectional view of an electronic device according to one embodiment of the present disclosure.

FIG. 5C is a cross-sectional view of an electronic device according to one embodiment of the present disclosure.

Where the structure of FIG. 5C is substantially similar to the structure of FIG. 5A, the corresponding detailed descriptions shall be omitted.

Referring to FIG. 5C, a bracket 513 can be interposed between the EMR sensor pad 510 and the pen mounting space 5032 of the housing 503. According to an embodiment, the bracket 513 placed there to reinforce rigidity of the electronic device 500. In this case, the bracket 513 can be made of metal. When the electronic pen 520 is completely inserted into the pen mounting space 5032 of the housing 503, an opening 5131 of the bracket 513 corresponding to the area A overlapping the coil body 523 can be also formed. Alternatively, the opening 5131 may be replaced with a nonconductive material (e.g., polycarbonates). The nonconductive material can be combined with the metal material of the bracket 513 using double injection or insert-molding. Hence, the area A for receiving the feedback signal of the coil body 523, the opening 5121 of the shielding member 512, and the opening 5131 of the bracket 513 can at least partially vertically overlap with each other.

Figure 6:
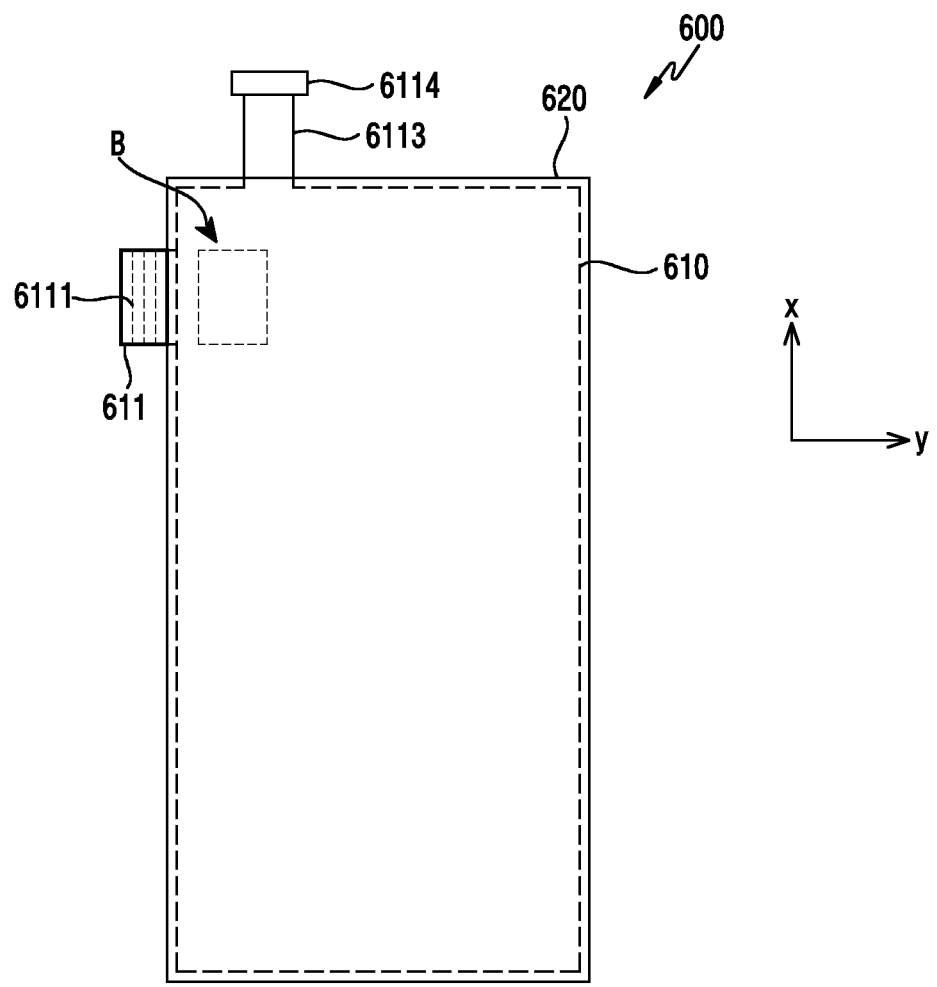
FIG. 6 is a diagram of an EMR sensor pad according to one embodiment of the present disclosure.

FIG. 6 depicts an EMR sensor pad according to one embodiment of the present disclosure.

Referring to FIG. 6, an EMR sensor pad 600 can include a sensor member 610 which includes a plurality of conductive patterns and a shielding member 620 deposited under the sensor member 610 such that the sensor member 610 can generally sense only in one direction. According to an embodiment, a pen detection portion 611 of the sensor member 610 can include a separate conductive pattern 6111 for recognizing electronic pen insertion. The pen detection portion 611 can extend from one side of the sensor member 610. Like the sensor member 610, the pen detection portion 611 can include an FPC and a conductive pattern.

According to one embodiment, the pen detection portion 611 can protrude from the sensor member 610 outside the shielding member 620. The pen detection portion 611 can be attached to the rear side of the shielding member 620 and can be folded over the shielding member 620 so that the pen detection portion 611 overlaps with the coil body of the electronic pen. Accordingly, the shielding member 620 does not shield the pen detection portion 611. When the rear side of the shielding member 620 includes a bracket, the pen detection portion 611 can be attached to the rear side of the bracket. Thus, there is no need to remove an area B of the shielding member 620. Notably, the pen detection portion 611 may not be folded and may be extended past the shielding member 620, as long as the pen detection portion 611 overlaps with the coil body when the electronic pen is inserted in the electronic device.

A control circuit (e.g., a driver IC) connected to the sensor member 610 by means of the FPC 6113 and the connector 6114 may be mounted on a substrate (e.g., a main board) of the electronic device. According to an embodiment, the control circuit can receive a feedback signal of the electronic pen detected by the conductive patterns 6111 of the sensor member 610 and forward the signal to the processor of the electronic device.

Figure 7:
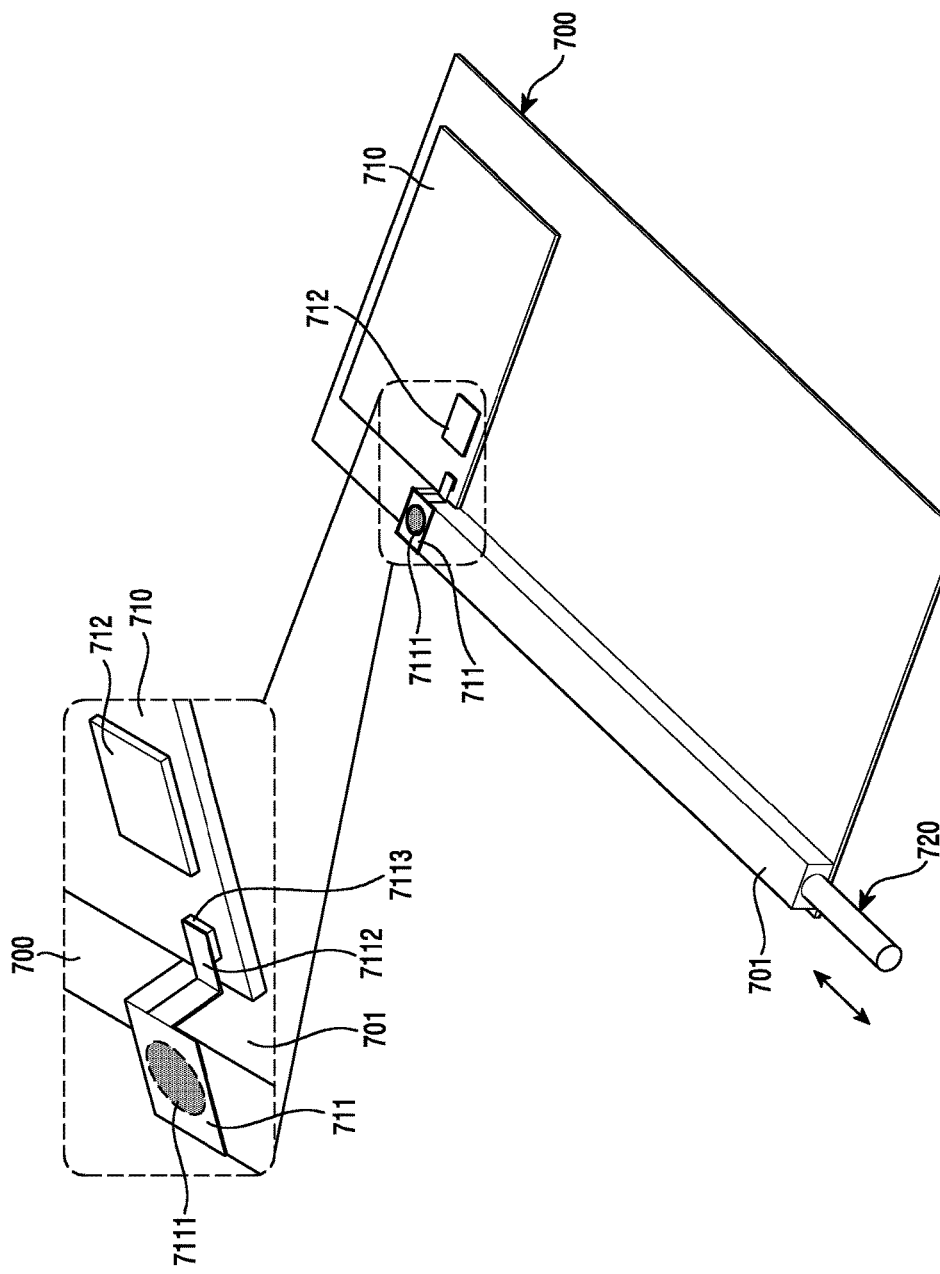
FIG. 7 is a diagram of an electronic device including a detection circuit for detecting whether an electronic pen is inserted according to one embodiment of the present disclosure.

FIG. 7 is a diagram of an electronic device including a detection circuit for detecting whether an electronic pen is inserted according to one embodiment of the present disclosure, where the detection circuit is separated from an EMR sensor pad.

Referring to FIG. 7, a substrate 710 (e.g., a PCB, a FPCB, etc.) can be disposed in a housing 700 of an electronic device including the pen mounting space 701. According to an embodiment, the detection circuit 711 can be electrically coupled to the substrate 710 through a connector 7113 of the FPC 7112. The detection circuit 711 can be placed in an area of the housing 700 which overlaps the coil body of the electronic pen 720 when an electronic pen 720 is completely inserted into the pen mounting space 701. The detection circuit 711 can include a conductive pattern 7111 for recognizing the insertion of the electronic pen 720. The conductive pattern of the detection circuit 711 can be formed on the FPC 7112. A control circuit 712 can be mounted on the substrate 710, and the control circuit 712 can process a feedback signal according to the insertion of the electronic pen 720.

According to one embodiment, the housing can include a first surface, a second surface opposite to the first side, and a side surface disposed along edges between the first surface and the second surface. According to an embodiment, when the housing is completely coupled by means of the first surface, the second surface, and the side surface, a waterproofing structure can be built. According to an embodiment, the housing can build the waterproofing structure with a window including a display module disposed on the first surface. According to an embodiment, the housing can build the waterproofing structure with a rear cover (e.g., a rear glass) disposed on the second surface opposite to the first surface. According to an embodiment, the pen mounting space 701 in the housing can be isolated from an inside of the housing and waterproofed.

According to one embodiment, the present disclosure detects the insertion of the electronic pen using electromagnetic induction. For example, an electronic device which uses a capacitive electronic pen as the auxiliary input means may detect the insertion of the capacitive electronic pen into the pen mounting space by use of the touch sensor for detecting touch on the display and a control circuit electrically coupled thereto.

Figure 8:
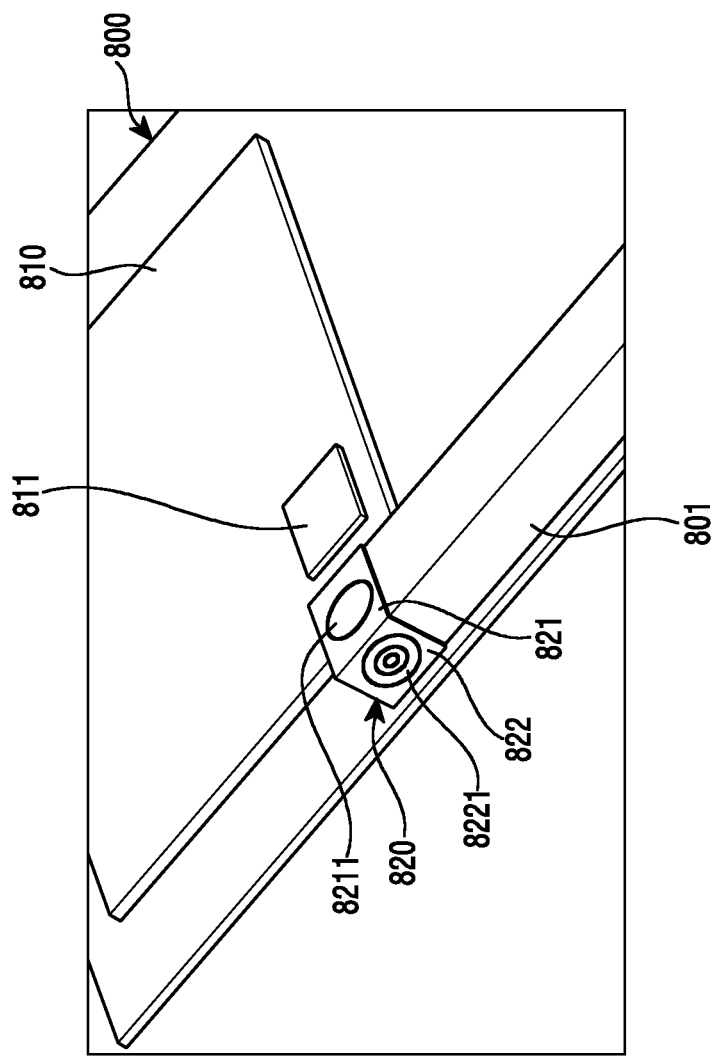
FIG. 8 is a diagram of an electronic device including a detection circuit for detecting whether an electronic pen is inserted according to one embodiment of the present disclosure.

FIG. 8 depicts an electronic device including a detection circuit for detecting whether an electronic pen is inserted according to one embodiment of the present disclosure.

In FIG. 8, as a modified embodiment of FIG. 7, a substrate 810 (e.g., a PCB, a FPC, etc.) can be disposed in a housing 800 of the electronic device including a pen mounting space 801. According to an embodiment, a detection circuit 820 can be electrically coupled to the substrate 810 by means of an FPC.

According to one embodiment, the detection circuit 820 can include a conductive pattern formed on the FPC. According to an embodiment, the detection circuit 820 can include a first member 821 including a first conductive pattern 8211 for detecting a feedback signal of the electronic pen mounted in the pen mounting space 801, and a second member 822 including a second conductive pattern 8221 for detecting another input of the electronic device. According to an embodiment, the first member 821 and the second member 822 can be integrated, and bent at a certain angle. According to an embodiment, the second member 822 can detect pressing of a key button (e.g., the side key button 308 of FIG. 3B). Alternatively, the second conductive pattern 8221 may include a grip sensing conductive pattern for detecting a user's grip in the electronic device. The inputs detected by the second conductive pattern 8221 are not so limited and may include other inputs.

According to one embodiment, when the electronic pen is completely inserted in the pen mounting space 801, the first member 821 can be disposed in a housing area which overlaps the coil body of the electronic pen. According to an embodiment, a control circuit 811 can be mounted on a substrate 810, and the control circuit 811 can process the feedback signal according to the insertion of the electronic pen. The control circuit 811 may also process feedback signals from an EMR sensor pad the electronic pen is in use. Also, the control circuit 811 may process the feedback signal from the second member 822.

Figure 9A:
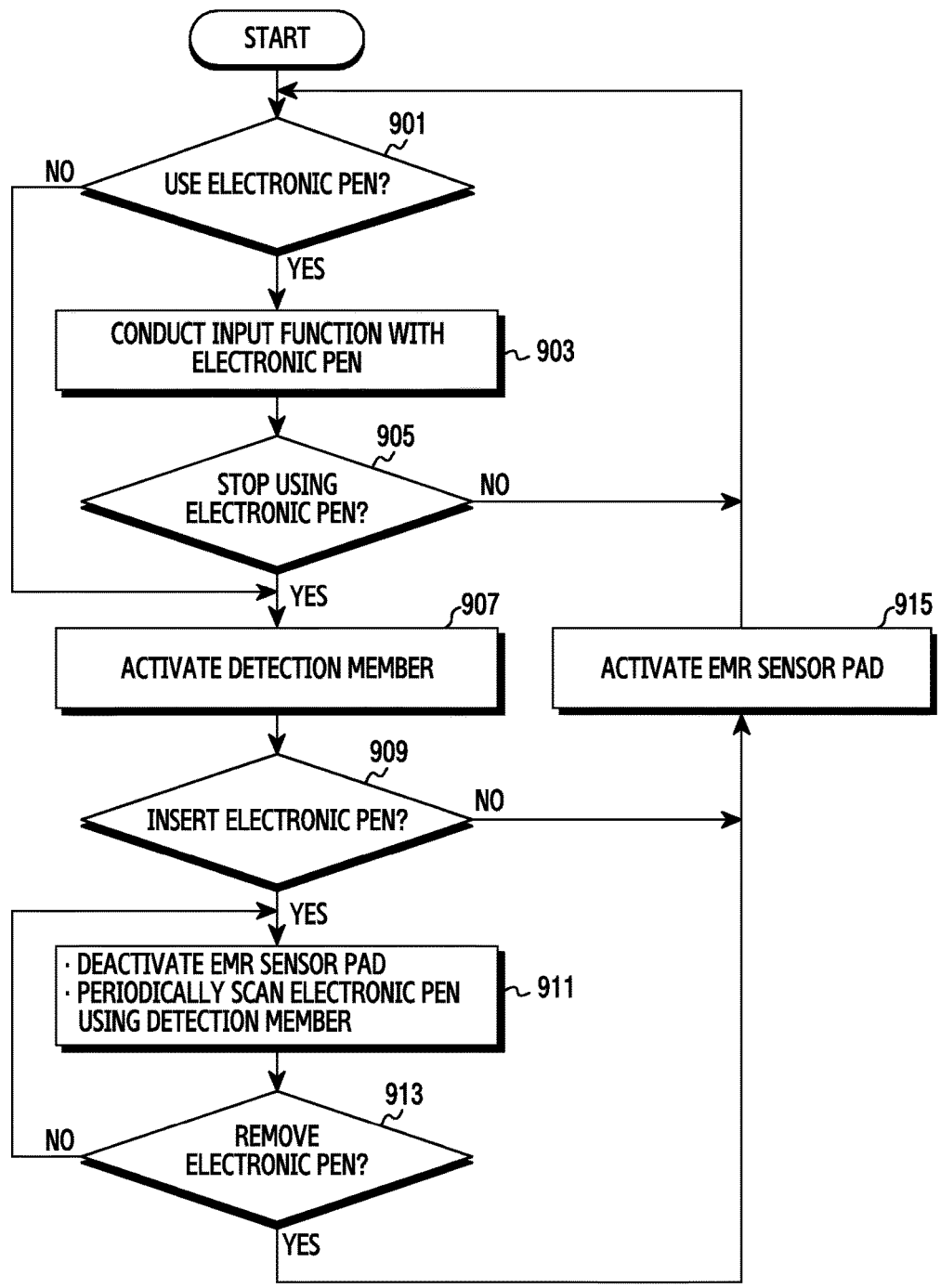
FIG. 9A is a flowchart of a method for detecting whether an electronic pen is inserted according to one embodiment of the present disclosure.

FIG. 9A is a flowchart of a method for detecting whether an electronic pen is inserted according to one embodiment of the present disclosure.

The operations shown in FIG. 9A can be performed by the embodiment shown in FIG. 7.

Referring to FIG. 9A, the electronic device can detect use of the electronic pen 720 in operation 901. According to an embodiment, the electronic device can detect whether the electronic pen 720 is extracted from the pen mounting space 701 of the electronic device by the user in order to conduct the input function through the display of the electronic device.

When the electronic pen 720 is detected to be in user, the electronic device can perform the input function in operation 903. In this case, the electronic device can detect data input of the electronic pen 720 by receiving the feedback signal based on the resonance frequency of the coil body of the electronic pen 720 through the EMR sensor pad. According to an embodiment, the electronic device can detect that the electronic pen 720 directly contacts or hovers over its display. Upon detecting the input function of the electronic pen 720, the detection circuit 711 does not operate at all or operates at a relatively long scanning interval, to thus reduce power consumption of the electronic device.

In operation 905, the electronic device can detect whether the user stops using the electronic pen 720. According to an embodiment, when the input function of the electronic pen 720 is not conducted after a certain time, the electronic device can determine that the electronic pen 720 is not used.

In operation 907, the electronic device can activate the detection circuit 711. The detection circuit 711 can include the conductive pattern 7111 for recognizing the electronic pen insertion separately from the conductive pattern of the EMR sensor pad. When the detection circuit 711 activates, the electronic device can periodically scan whether the coil body of the electronic pen 720 approaches the detection circuit 711.

In operation 909, the electronic device can detect whether the electronic pen 720 is inserted. The electronic device can detect whether the electronic pen 720 is completely inserted into the pen mounting space 701 of the housing 700. The electronic pen 720 is inserted in the pen mounting space 701, and the electronic device can detect the insertion of the electronic pen 720 by receiving the feedback signal at the resonance frequency of the coil body of the electronic pen 720, when the coil boy resonates in the electromagnetic field generated by the detection circuit 711. The feedback signal can be fed to the control circuit 712 (e.g., the driver IC) mounted on the substrate 710, and the detected signal can be provided to the electronic device (e.g., the processor).

In operation 911, the electronic device can stop the operation of the EMR sensor pad and operate the detection circuit 711 to periodically scan the electronic pen 720. Upon detecting that the electronic pen 720 is inserted in the pen mounting space 701 of the housing 700, the EMR sensor pad can stop its operation or lengthen the scanning interval, to thus reduce the power consumption of the electronic device.

In operation 913, the electronic device can detect whether the electronic pen 720 is removed (extracted). Since the electronic device activates the detection circuit 720 to periodically scan the electronic pen 720, it can detect that the electronic pen 720 is removed from the pen mounting space 701 of the housing 700.

When the electronic pen 720 is removed from the pen mounting space 701, the electronic device can re-activate the EMR sensor pad in operation 915. For example, when the electronic pen 720 is removed from the pen mounting space 701, the electronic device can re-activate the EMR sensor pad in order to allow the data input function of the electronic pen 720.

When the electronic pen 720 does not perform the input function after the certain time in operation 901, the electronic device can determine that the user stopped using the electronic pen and activate the detection circuit 711 in operation 907.

The electronic device can detect that the electronic pen 720 is inserted into the pen mounting space 701, stop the operation of the EMR sensor pad when the electronic pen is inserted, and thus reduce the power consumption. According to an embodiment, the electronic device may reduce the power consumption by deactivating the detection circuit 711 while the electronic pen 720 is used (i.e. while data is input).

Figure 9B:
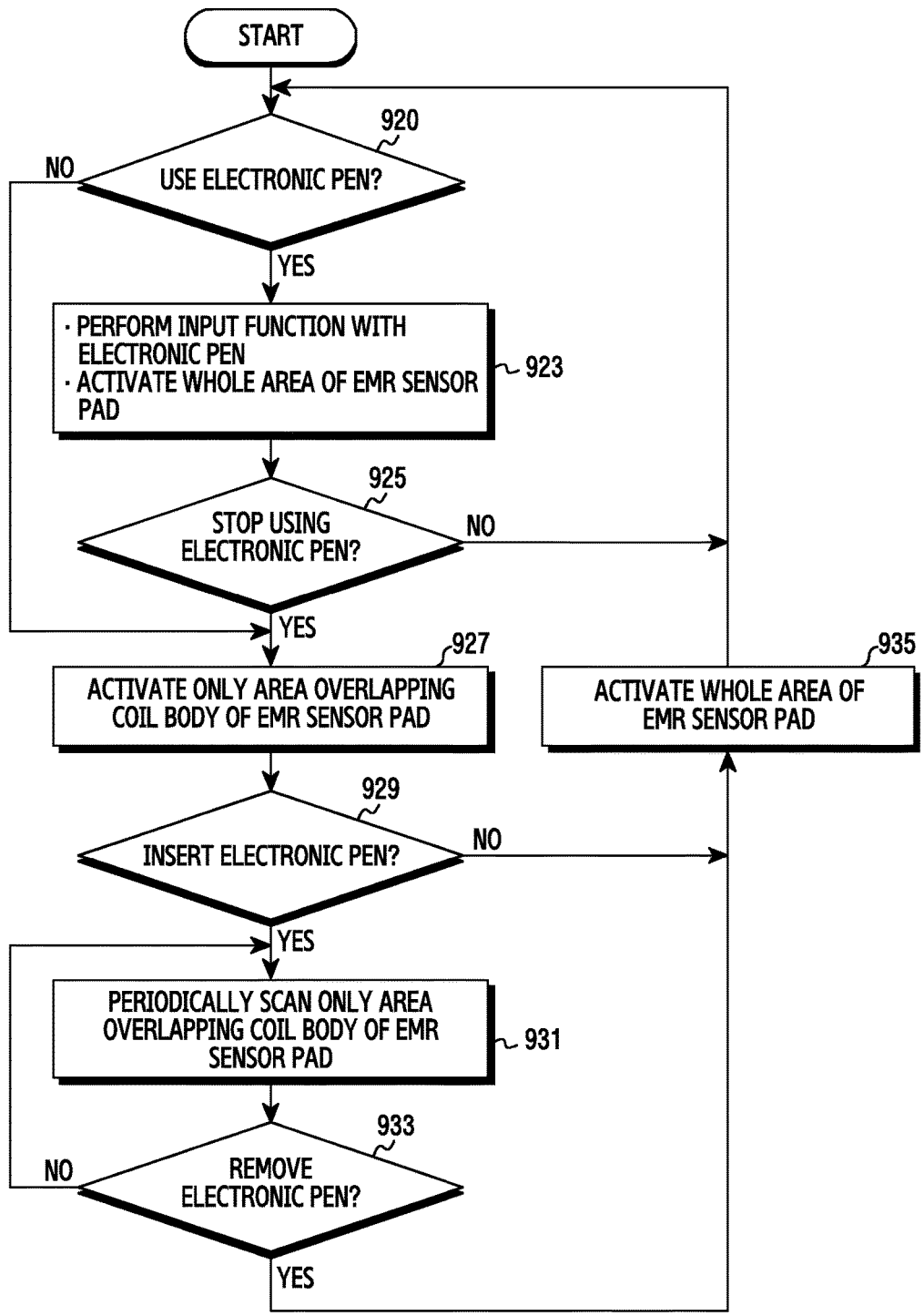
FIG. 9B is a flowchart of a method for detecting whether an electronic pen is inserted according to one embodiment of the present disclosure.

FIG. 9B is a flowchart of a method for detecting whether an electronic pen is inserted according to one embodiment of the present disclosure.

The operations shown in FIG. 9B can be performed by the embodiments shown in FIGS. 5A, 5B, and 5C.

Referring to FIG. 9B, the electronic device can detect use of the electronic pen 520 in operation 920. According to an embodiment, the electronic device can detect whether the electronic pen 520 is extracted from the pen mounting space 5032 of the electronic device to conduct the input function through the display 502 of the electronic device 500.

When the electronic pen 520 is detected to be in use, the electronic device 500 can conduct the input function in operation 923. In this case, the electronic device can detect data input of the electronic pen 520 by activating the whole area of the EMR sensor pad and receiving the feedback signal based on the resonance frequency of the coil body 523 of the electronic pen 520. According to an embodiment, the electronic device 500 can detect that the electronic pen 520 directly contacts or hovers over the display of the electronic device 500. According to an embodiment, upon detecting the input function, the electronic pen 520 can reduce the current consumption of the electronic device by deactivating the detection area overlapping the coil body 523 or activating the detection area at relatively long scanning intervals.

In operation 925, the electronic device 500 can detect whether the user stops using the electronic pen 520. According to an embodiment, when the input function of the electronic pen 520 is not detected after a certain time, the electronic device 500 can determine that the electronic pen 520 is not used.

In operation 927, the electronic device 500 can activate only the area A of the EMR sensor pad 510 overlapping the coil body 523 of the electronic pen 520. According to an embodiment, when only the overlapping area activates, the electronic device can periodically scan the presence of the coil body of the electronic pen 520 in the pen mounting space 5032.

In operation 929, the electronic device 500 can detect whether the electronic pen 520 is inserted. According to an embodiment, the electronic device can detect whether the electronic pen 520 is completely inserted into the pen mounting space 5032 of the housing 503. The electronic device 500 can detect the insertion of the electronic pen 520 by receiving the feedback signal at the resonance frequency of the coil body 523 through the opening 5121. The feedback signal may be fed to the control circuit (e.g., the driver IC) mounted on the substrate, and the detected signal can also be provided to the electronic device (e.g., the processor).

In operation 931, the electronic device can stop the operation of the whole area of the EMR sensor pad 510 and activate only the area A overlapping the coil body 523 to periodically scan for the electronic pen 520. Upon detecting that the electronic pen 520 is inserted in the pen mounting space 5032 of the housing 503, the electronic device 500 can deactivate or lengthen the scanning interval for most of the area of the EMR sensor pad 510 excluding the area A, to thus reduce power consumption.

In operation 933, the electronic device 500 can detect whether the electronic pen 520 is removed (extracted). Since the electronic device 500 activates the area A of the EMR sensor pad 510 overlapping the coil body 523 and periodically scans the electronic pen 520, it can detect that the electronic pen 520 is removed from the pen mounting space 5032.

When the electronic pen 520 is removed from the pen mounting space 5032, the electronic device 500 can re-activate the whole area of the EMR sensor pad 510 in operation 935. When the electronic pen 520 is removed from the pen mounting space 5032, the electronic device 500 can activate the whole area of the EMR sensor pad 510 to allow the electronic pen 520 to be used as an input device.

When the electronic pen 520 does not perform the input function even after the certain time in operation 920, the electronic device 500 can determine that the user stopped using the electronic pen 520 and activate only the area A overlapping the coil body 523 of the EMR sensor pad 510 in operation 927.

The electronic device can detect that the electronic pen 520 is inserted into the pen mounting space 5032, deactivate the most area excluding the overlapping area of the EMR sensor pad 519 during the insertion, and thus reduce the power consumption.

Figure 10:
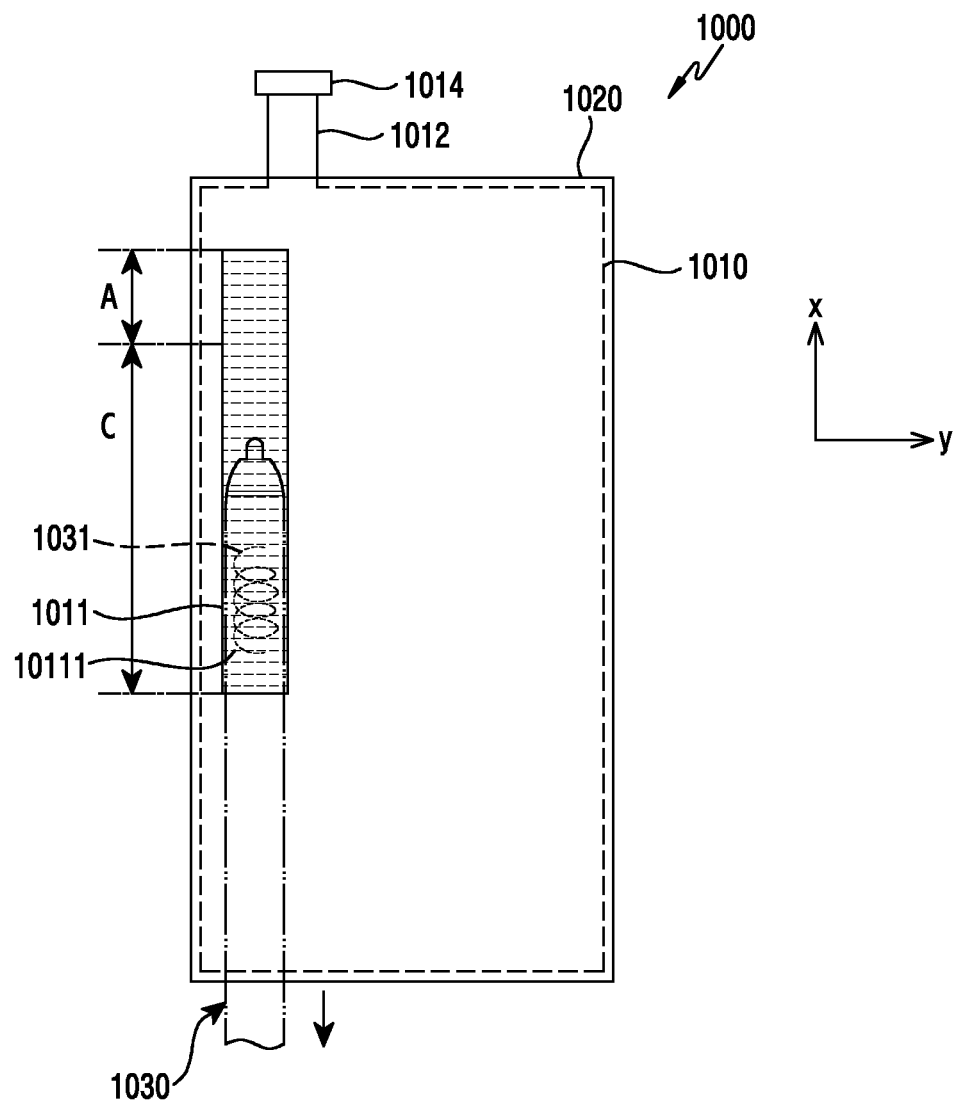
FIG. 10 is a diagram of an EMR sensor pad according to one embodiment of the present disclosure.

FIG. 10 depicts an EMR sensor pad according to one embodiment of the present disclosure.

Referring to FIG. 10, the EMR sensor pad 1000 can include a sensor member 1010 including a plurality of conductive patterns, and a shielding member 1020 deposited such that the sensor member 1010 generally senses in only one direction. According to an embodiment, the shielding member 1020 can include an area A overlapping a coil body area of the electronic pen 1030 and an area C including an extraction path of the electronic pen 1030 from the area A, when an electronic pen 1030 is completely inserted into a pen mounting space 1011 of a housing of the electronic device. Portions of the shielding member 1020 at the area A and the area C may be removed so that Area A and Area C represent openings in the shielding member 1020. Alternatively, Area A and Area C may be filled with dielectric members.

According to one embodiments, a detection circuit (i.e. portions of the conductive patterns of the EMR sensor pad 1000) can include a plurality of conductive patterns 10111 arranged in a direction (Y-axis direction) perpendicular to a mounting direction (X-axis direction) of the electronic pen at certain intervals. According to an embodiment, such conductive patterns 10111 can be used to detect the insertion of the electronic pen 1030. The conductive pattern 10111 may include a plurality of conductive patterns used to detect the data input function of the electronic pen 1030 on the display of the electronic device. Alternatively, the conductive pattern 10111 may be dedicated patterns used only to detect the insertion of the electronic pen 1030 and not data input by the electronic pen on the display.

According to one embodiment, the conductive patterns 10111 of the detection circuit can be disposed throughout an extraction path (the areas A and C) of the electronic pen 1030. According to an embodiment, using the conductive patterns 10111, the electronic device can detect a speed and a position of the extraction and the insertion of the electronic pen 1030. When the coil body of the electronic pen 1030 is detected in the area A over a certain time, the electronic device can detect the full insertion of the electronic pen 1030. Due to the conductive patterns 10111 of the detection circuit arranged perpendicularly to the insertion direction of the electronic pen 1030, the electronic device may detect the speed and the position of the insertion and/or extraction of the electronic pen 1030 as the electronic pen 1030 is inserted and/or extracted. Using the speed or position information, the electronic device may execute a corresponding function of an application (e.g., game).

According to one embodiments, a control circuit (e.g., a driver IC) connected the sensor member 1010 by means of an FPC 1012 and a connector 1014 may be mounted on a substrate (e.g., a main board) of the electronic device. According to an embodiment, the control circuit can receive a feedback signal of the electronic pen 1030 from the conductive patterns of the sensor member 1010, and forward the feedback signal to a processor of the electronic device.

Figure 11:
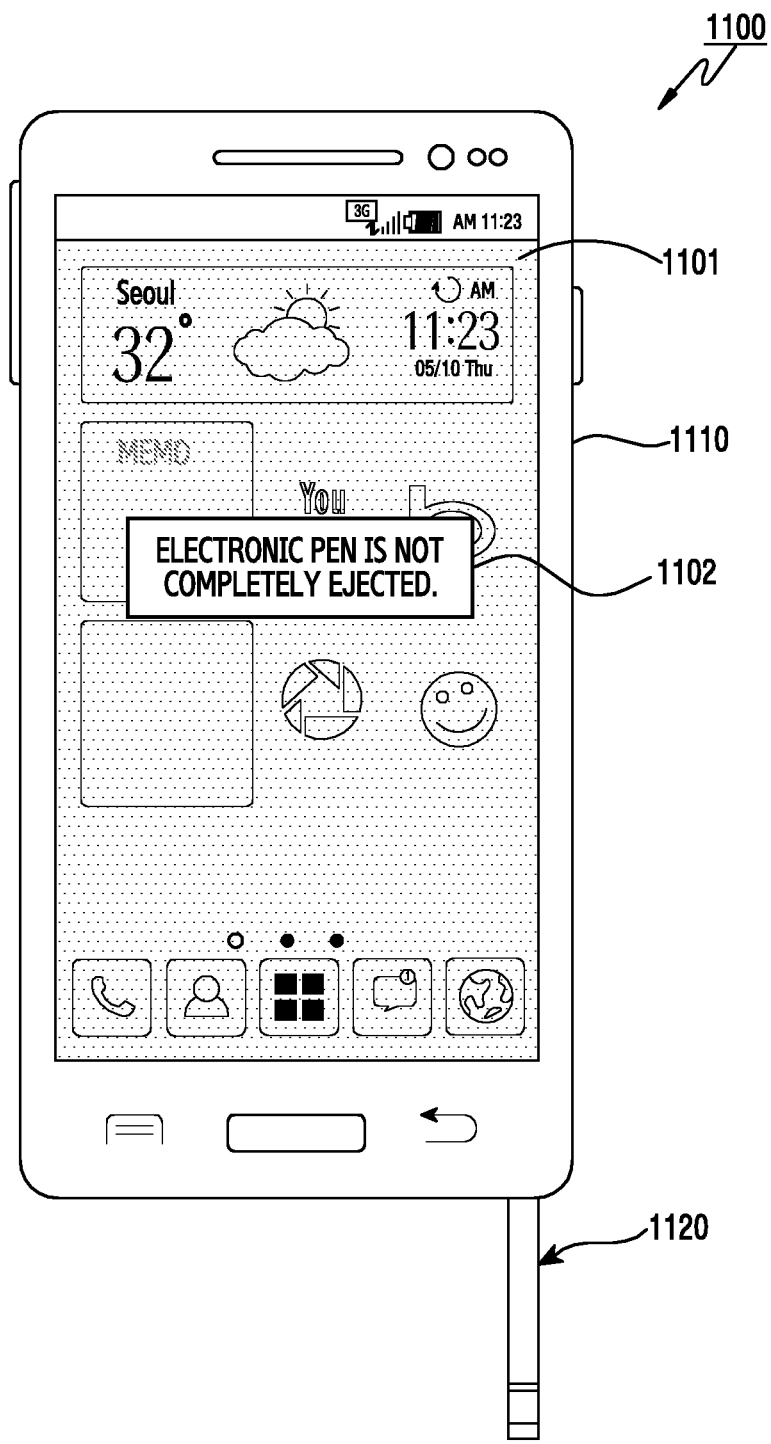
FIG. 11 is a diagram of an electronic device displaying notification information when an electronic pen is not fully ejected from the electronic device of FIG. 10 according to one embodiment of the present disclosure.

FIG. 11 depicts an electronic device displaying notification information when an electronic pen is not fully ejected from the electronic device of FIG. 10 according to one embodiment of the present disclosure.

The EMR sensor pad 1000 including the detection circuit with the conductive patterns 10111 can be applied to an electronic device 1100 of FIG. 11.

Referring to FIG. 11, the electronic device 1100 can detect that an electronic pen 1120 is not completely ejected from a housing 1110 of the electronic device 1100, based on the conductive patterns of the detection circuit. According to an embodiment, to notify the user of the electronic device 1100 that the electronic pen 1120 is not completely ejected from the housing 1110, the electronic device 1100 can output, but not limited to, a notification message 1102 through a display 1101. To guide the complete extraction or the complete insertion of the electronic pen 1120, the electronic device 1100 may output an audible notification (e.g., voice or sound) and/or a tactile notification (e.g., vibration). As such, the electronic device 1100 can notify the user of the incomplete extraction or insertion of the electronic pen 1120, which is not recognized by the user, and thus prevent a malfunction or damage of the electronic device 1100.

As set forth above, since the insertion of the electronic pen is detected using existing electronic components, the space occupied by the electronic device and manufacturing cost for the electronic device may be minimized. Also as set forth above, power consumption can also be reduced.

According to one embodiment, an electronic device can include a housing including a first surface, a second surface, and a third surface, the first and second surface defining an electronic component mounting space and the second and third surface defining a pen mounting space adapted to receive an electronic pen; and a display and an ElectroMagnetic Resonance (EMR) sensor pad disposed in the electronic component mounting space. When the electronic pen is mounted in the pen mounting space, the EMR sensor pad may detect a resonance frequency of the coil body of the electronic pen.

According to one embodiment, the electronic device can further include a conductive member interposed between the EMR sensor pad and the second surface, the conductive member includes an opening that overlaps with the coil body when the electronic pen is mounted in the pen mounting space. When the electronic pen is mounted in the pen mounting space, the EMR sensor pad detects the resonance frequency of the coil body of the electronic pen through the opening According to one embodiment, the opening is filled by a nonconductive member using double injection or insert-molding According to various embodiments, the conductive member can include a shielding member attached to the EMR sensor pad.

According to one embodiment, the conductive member can include a conductive bracket for reinforcing rigidity of the electronic device.

According to one embodiment, conductive patterns of the EMR sensor pad are configured to detect a location of the electronic pen when the electronic pen is in use; and detect that the electronic pen is mounted in the pen mounting space when the electronic pen is not in use.

According to one embodiment, the conductive patterns can include a first pattern array arranged at predetermined intervals in a first direction and a second pattern array crossing the first pattern array.

According to one embodiment, the EMR sensor pad can include a pen detection portion not shielded by a conductive member interposed between the EMR sensor pad and the second surface. When the electronic pen is mounted in the pen mounting space, the pen detection portion of the EMR sensor pad detects the resonance frequency of the coil body of the electronic pen.

According to one embodiment, the pen detection portion of the EMR sensor pad is attached to a rear side of the conductive member.

According to one embodiment, an electronic can include a housing including a first surface, a second surface, and a third surface, the first and second surface defining an electronic component mounting space and the second and third surface defining a pen mounting space adapted to receive an electronic pen; a display and an ElectroMagnetic Resonance (EMR) sensor pad disposed in the electronic component mounting space; and a detection circuit interposed between the first surface and the second surface and adapted to detect, when the electronic pen is mounted in the pen mounting space, a resonance frequency of a coil body of the electronic pen.

According to one embodiment, the detection circuit is electrically coupled to a control circuit mounted on a substrate of the electronic device, and includes a plurality of conductive patterns disposed at a position overlapping at least a part of the coil body of the electronic pen when the electronic pen is mounted in the pen mounting space.

According to one embodiment, the conductive patterns includes a first area for detecting insertion of the electronic pen; and a second area extending from the first area for detecting another input of the electronic device.

According to one embodiment, the other input of the electronic device is a button key input or a grip input.

According to one embodiment, a method for recognizing electronic pen insertion into an electronic device may include: detecting whether a user stops using the electronic pen; when the user stops using the electronic pen, driving the detection circuit; detecting insertion of the electronic pen using the detection circuit; when the insertion of the electronic pen is detected, stop driving an ElectroMagnetic Resonance (EMR) sensor pad which detects data input from the electronic pen; detecting whether the electronic pen is extracted from the electronic device; and when the electronic pen is extracted, re-driving the EMR sensor pad.

According to one embodiment, the method may further include stopping the detection circuit when the data input from the electronic pen is detected through the EMR sensor pad.

According to one embodiment, the method may further include detecting, by the detection circuit, a speed or a position of the electronic pen when the electronic pen is inserted or extracted.

According to one embodiment, at least part of functions of an application executed in the electronic device is performed using the detected insertion and/or extraction speed or position information of the electronic pen.

According to one embodiment, the method may further include detecting incomplete insertion or extraction of the electronic pen using the detected insertion and/or extraction speed or position information of the electronic pen; and outputting notification information about the incomplete insertion or extraction of the electronic pen.

According to one embodiment, an electronic device may include a housing comprising a first surface and a second surface opposite to the first surface; a hole extending lengthwise into the housing; a display exposed through the first surface; a stylus pen adapted to be inserted into the hole; a detection circuit for detecting whether the stylus pen approaches or hovers over the display; and a processor electrically coupled to the display and the detection circuit. The detection circuit also detects whether the stylus pen is inserted into the hole.

According to one embodiment, using electromagnetic induction, the detection circuit detects whether the stylus pen is inserted into the hole.

According to one embodiment, the detection circuit is electrically coupled to a conductive pattern disposed near the hole.

According to one embodiment, an inner space of the housing and an inside of the hole are separated from each other, and the conductive pattern is disposed in the inner space.

Aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
   a housing comprising a first surface, a second surface, and a third surface, the first and second surfaces defining an electronic component mounting space and the second and third surfaces defining a pen mounting space adapted to receive an electronic pen; and
   a display;
   an Electro Magnetic Resonance (EMR) sensor pad disposed in the electronic component mounting space; and
   a conductive member interposed between the EMR sensor pad and the second surface, the conductive member including an opening that overlaps with a coil body when the electronic pen is mounted in the pen mounting space,
   wherein when the electronic pen is mounted in the pen mounting space, the EMR sensor pad detects a resonance frequency of the coil body of the electronic pen through the opening.

2. The electronic device of claim 1, wherein the opening is filled by a non: conductive member using double injection or insert-molding.

3. The electronic device of claim 1, wherein the conductive member comprises:
   a shielding member attached to the EMR sensor pad and/or a conductive bracket for reinforcing rigidity of the electronic device.

4. The electronic device of claim 1, wherein conductive patterns of the EMR sensor pad are configured to:
   detect a location of the electronic pen when the electronic pen is in use; and
   detect that the electronic pen is mounted in the pen mounting space when the electronic pen is not in use.

5. The electronic device of claim 4, wherein the conductive patterns comprise:
   a first pattern array arranged at predetermined intervals in a first direction; and
   a second pattern array crossing the first pattern array.

6. The electronic device of claim 1, wherein the EMR sensor pad includes a pen detection portion not shielded by the conductive member interposed between the EMR sensor pad and the second surface, and
   when the electronic pen is mounted in the pen mounting space, the pen detection portion of the EMR sensor pad detects the resonance frequency of the coil body of the electronic pen.

7. The electronic device of claim 6, wherein the pen detection portion of the EMR sensor pad is attached to a rear side of the conductive member.

8. An electronic device comprising:
- a housing comprising a first surface, a second surface, and a third surface, the first and second surfaces defining an electronic component mounting space and the second and third surfaces defining a pen mounting space adapted to receive an electronic pen;
- a display;
- an Electro Magnetic Resonance (EMR) sensor pad disposed in the electronic component mounting space;
- a detection circuit extending from a conductive pattern of the EMR sensor pad, interposed between the first surface and the second surface and adapted to detect, when the electronic pen is mounted in the pen mounting space, a resonance frequency of a coil body of the electronic pen; and
- a conductive member interposed between the detection circuit and the second surface, the conductive member including an opening that overlaps with the coil body when the electronic pen is mounted in the pen mounting space,
- wherein when the electronic pen is mounted in the pen mounting space, the detection circuit detects the resonance frequency of the coil body of the electronic pen through the opening.

9. The electronic device of claim 8, wherein the detection circuit is electrically coupled to a control circuit mounted on a substrate of the electronic device, and comprises a plurality of conductive patterns disposed at a position overlapping at least a part of the coil body of the electronic pen when the electronic pen is mounted in the pen mounting space.

10. The electronic device of claim 9, wherein the conductive patterns comprise:
- a first area for detecting insertion of the electronic pen; and
- a second area extending from the first area for detecting another input of the electronic device.

11. The electronic device of claim 10, wherein the another input of the electronic device is a button key input or a grip input.

12. A method for recognizing electronic pen insertion into an electronic device, the electronic device comprising a detection circuit for detecting a resonance frequency of a coil body of an electronic pen, the method comprising:
- detecting, by an Electro Magnetic Resonance (EMR) sensor pad, whether a user stops using the electronic pen;
- detecting, by the detection circuit, a speed or a position of the electronic pen when the electronic pen is inserted or extracted,
- detecting incomplete insertion or extraction of the electronic pen using the detected insertion and/or extraction speed or position information of the electronic pen; and
- outputting notification information indicating the incomplete insertion or extraction of the electronic pen,
- when the user stops using the electronic pen, driving the detection circuit, the detection circuit extending from a conductive pattern of the EMR sensor pad;
- detecting insertion of the electronic pen using the detection circuit;
- when the insertion of the electronic pen is detected, stop driving the EMR sensor pad which detects data input from the electronic pen;
- detecting whether the electronic pen is extracted from electronic device; and
- when the electronic pen is extracted, re-driving the EMR sensor pad.

13. The method of claim 12, further comprising:
- stopping the detection circuit when the data input from the electronic pen is detected through the EMR sensor pad.

14. The method of claim 12, wherein at least some functions of an application executed in the electronic device are performed using the detected insertion and/or extraction speed or position information of the electronic pen.

* * * * *